(12) United States Patent
Perring et al.

(10) Patent No.: US 12,326,983 B2
(45) Date of Patent: Jun. 10, 2025

(54) FULL KEY CUSTOMIZATION ON AN INPUT DEVICE

(71) Applicant: Logitech Europe S.A., Lausanne (CH)

(72) Inventors: Richard Perring, Lausanne (CH); Junghyun Kim, Morges (CH); David Farcy, Epalinges (CH); Christine Flores, Seattle, WA (US); Andrew Coonrad, Newark, CA (US); Chris Hughes, San Jose, CA (US); Jacob Kottage, Newark, CA (US); Keson Tsao, Hsinchu (TW); Zoe Su, Hsinchu (TW)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 18/498,362

(22) Filed: Oct. 31, 2023

(65) Prior Publication Data
US 2025/0138649 A1    May 1, 2025

(51) Int. Cl.
*G06F 3/02* (2006.01)
*G06F 3/023* (2006.01)

(52) U.S. Cl.
CPC ................... *G06F 3/0238* (2013.01)

(58) Field of Classification Search
CPC ....................................................... G06F 3/023
See application file for complete search history.

(56) References Cited

U.S. PATENT DOCUMENTS

| 7,757,185 B2 * | 7/2010 | Paquette | G06F 3/0238 |
| | | | 715/810 |
| 2017/0160818 A1 * | 6/2017 | Knighton | G06F 3/0221 |
| 2023/0121241 A1 * | 4/2023 | Fausak | G06F 3/0227 |
| | | | 715/866 |

* cited by examiner

*Primary Examiner* — Joseph R Haley
(74) *Attorney, Agent, or Firm* — Kilpatrick Townsend & Stockton LLP

(57) ABSTRACT

A method comprising receiving a first control signal indicating that a first key on a keyboard is being pressed, the first key functionally assigned as a (logical) modifier; sending a first make command indicating that the modifier is active; receiving a second control signal indicating that a second key on the keyboard is contemporaneously being pressed, the second key functionally assigned as a non-modifier, alphanumeric character; accessing a key remapping database stored on the keyboard that includes key triggers and remapped key targets; in response to determining that the combination of the first key and second keys are included as a key trigger in the key remapping database: sending a first break command indicating that the modifier is inactive; and sending a second make command corresponding to a key target of the remapping database that is associated with the combination of the first and second keys being pressed.

17 Claims, 12 Drawing Sheets

FULL KEY CUSTOMIZATION ON AN INPUT DEVICE

BACKGROUND

Input devices such as keyboards or key-based computer peripheral devices remain a popular and effective user interface between human and computer. Keyboards have evolved and improved over the years in quality, function, ergonomics, and longevity. Modern keyboards often include number pads, function keys, media keys, and many other key functions in any number of different configurations. Despite the many configurations and options available to consumers, keyboards are often locked into particular key arrangements and corresponding functions. As such, users may resort to buying multiple keyboard devices to better accommodate particular applications, which can be costly and wasteful. Better solutions are needed.

BRIEF SUMMARY

In some embodiments, a method comprises: receiving, by one or more processors of a keyboard, a first control signal indicating that a first key on the keyboard is being pressed, the first key functionally assigned as a modifier; sending, by the one or more processors to a host computing device communicatively coupled to the keyboard, a first make command indicating that the modifier is active; receiving, by the one or more processors, a second control signal indicating that a second key on the keyboard is contemporaneously being pressed, the second key functionally assigned as a non-modifier, alphanumeric character; accessing, by the one or more processors, a key remapping database stored on the keyboard that includes key triggers and remapped key targets, each key trigger corresponding to a specific combination of one or more keys of the keyboard, and each corresponding key target corresponding to a different functional assignment than a default functional assignment for the combination of the one or more keys. In some embodiments, in response to determining that the combination of the first key and the second key are included as a key trigger in the key remapping database, the method includes sending, by the one or more processors to the host computing device while the first and second keys are pressed, a first break command indicating that the modifier is inactive; and sending, by the one or more processors to the host computing device while the first and second keys are pressed, a second make command corresponding to a key target of the remapping database that is associated with the combination of the first key and second keys being pressed. In some embodiments, in response to determining that the combination of the first key and the second key are not included as a key trigger in the key remapping database, the method includes sending, by the one or more processors to the host computing device while the first and second keys are pressed, a third make command corresponding to the non-modifier, alphanumeric character of the second key.

In some cases, the method includes receiving, by the one or more processors, an indication that the second key on the keyboard is released, and sending, by the one or more processors to the host computing device, a second break command indicating that the target key be terminated. The method can further include receiving, by the one or more processors, a third control signal indicating that a third key on the keyboard is being pressed while the first key remains pressed; accessing, by the one or more processors, the key remapping database; and in response to determining that the combination of the first key and the third key are included as a key trigger in the remapping database, the method can include sending, by the one or more processors to the host computing device while the first and third keys are pressed, a third make command corresponding to a key target of the remapping database that is associated with the combination of the first key and third keys being pressed. In certain embodiments, the method can include, in response to determining that the combination of the first key and the third key are not included as a key trigger in the remapping database: sending, by the one or more processors to the host computing device while the first and third keys are pressed, a fourth make command indicating that the modifier is switched from inactive to active; and sending, by the one or more processors to the host computing device while the first and third keys are pressed, a fifth make command corresponding to a default functional assignment of the third key. In some embodiments, the method can include receiving, by the one or more processors, an indication that the third key on the keyboard is released; sending, by the one or more processors to the host computing device, a third break command indicating that the default functional assignment of the third key be terminated; receiving, by the one or more processors, an indication that the first key on the keyboard is released; and sending, by the one or more processors to the host computing device, a fourth break command indicating that the modifier is released. In some cases, the key target can include a combination of a plurality of functional assignments. The key remapping database can be stored as a list-based or bitfield based database on memory stored on the keyboard. The keyboard may communicate with the host computing device via human interface device (HID)-type commands.

In certain embodiments, a keyboard comprises: one or more processors; one or more non-transitory, computer-readable storage mediums containing instructions configured to cause the one or more processors to perform operations including: receiving, by the one or more processors of the keyboard, a first control signal indicating that a first key on the keyboard is being pressed, the first key functionally assigned as a modifier; sending, by the one or more processors to a host computing device communicatively coupled to the keyboard, a first make command indicating that the modifier is active; receiving, by the one or more processors, a second control signal indicating that a second key on the keyboard is contemporaneously being pressed, the second key functionally assigned as a non-modifier, alphanumeric character; accessing, by the one or more processors, a key remapping database stored on the keyboard that includes key triggers and remapped key targets, each key trigger corresponding to a specific combination of one or more keys of the keyboard, and each corresponding key target corresponding to a different functional assignment than a default functional assignment for the combination of the one or more keys. In some aspects, in response to determining that the combination of the first key and the second key are included as a key trigger in the key remapping database, the method includes sending, by the one or more processors to the host computing device while the first and second keys are pressed, a first break command indicating that the modifier is inactive; and sending, by the one or more processors to the host computing device while the first and second keys are pressed, a second make command corresponding to a key target of the remapping database that is associated with the combination of the first key and second keys being pressed. In some cases, the instructions are further configured to cause the one or more processors to perform operations including: in response to determining that the combination of the first key and the second key are not included as a key trigger in the key remapping database: sending, by the one or more processors to the host computing device while the first and second keys are pressed, a third make command corresponding to the non-modifier, alphanumeric character of the second key.

In further embodiments, the instructions are further configured to cause the one or more processors to perform operations including: receiving, by the one or more processors, an indication that the second key on the keyboard is released; and sending, by the one or more processors to the host computing device, a second break command indicating that the target key be terminated. In some aspects, the instructions are further configured to cause the one or more processors to perform operations including: receiving, by the one or more processors, a third control signal indicating that a third key on the keyboard is being pressed while the first key remains pressed; accessing, by the one or more processors, the key remapping database; in response to determining that the combination of the first key and the third key are included as a key trigger in the remapping database: sending, by the one or more processors to the host computing device while the first and third keys are pressed, a third make command corresponding to a key target of the remapping database that is associated with the combination of the first key and third keys being pressed. In certain implementations, the instructions are further configured to cause the one or more processors to perform operations including: in response to determining that the combination of the first key and the third key are not included as a key trigger in the remapping database: sending, by the one or more processors to the host computing device while the first and third keys are pressed, a fourth make command indicating that the modifier is switched from inactive to active; and sending, by the one or more processors to the host computing device while the first and third keys are pressed, a fifth make command corresponding to a default functional assignment of the third key. In some cases, the instructions are further configured to cause the one or more processors to perform operations including: receiving, by the one or more processors, an indication that the third key on the keyboard is released; sending, by the one or more processors to the host computing device, a third break command indicating that the default functional assignment of the third key be terminated; receiving, by the one or more processors, an indication that the first key on the keyboard is released; sending, by the one or more processors to the host computing device, a fourth break command indicating that the modifier is released.

In some embodiments, a non-transitory computer-program product tangibly embodied in a machine-readable non-transitory storage medium that includes instructions configured to cause one or more processors to perform operations including: receiving, by the one or more processors of a keyboard, a first control signal indicating that a first key on the keyboard is being pressed, the first key functionally assigned as a modifier; sending, by the one or more processors to a host computing device communicatively coupled to the keyboard, a first make command indicating that the modifier is active; receiving, by the one or more processors, a second control signal indicating that a second key on the keyboard is contemporaneously being pressed, the second key functionally assigned as a non-modifier, alphanumeric character; accessing, by the one or more processors, a key remapping database stored on the keyboard that includes key triggers and remapped key targets, each key trigger corresponding to a specific combination of one or more keys of the keyboard, and each corresponding key target corresponding to a different functional assignment than a default functional assignment for the combination of the one or more keys; in response to determining that the combination of the first key and the second key are included as a key trigger in the key remapping database: sending, by the one or more processors to the host computing device while the first and second keys are pressed, a first break command indicating that the modifier is inactive; and sending, by the one or more processors to the host computing device while the first and second keys are pressed, a second make command corresponding to a key target of the remapping database that is associated with the combination of the first key and second keys being pressed.

In some aspects, the instructions further cause one or more processors to perform operations including: in response to determining that the combination of the first key and the second key are not included as a key trigger in the key remapping database: sending, by the one or more processors to the host computing device while the first and second keys are pressed, a third make command corresponding to the non-modifier, alphanumeric character of the second key. In some cases, the instructions further cause one or more processors to perform operations including: receiving, by the one or more processors, an indication that the second key on the keyboard is released; and sending, by the one or more processors to the host computing device, a second break command indicating that the target key be terminated. In some implementations, the instructions are further configured to cause the one or more processors to perform operations including: receiving, by the one or more processors, a third control signal indicating that a third key on the keyboard is being pressed while the first key remains pressed; accessing, by the one or more processors, the key remapping database; in response to determining that the combination of the first key and the third key are included as a key trigger in the remapping database: sending, by the one or more processors to the host computing device while the first and third keys are pressed, a third make command corresponding to a key target of the remapping database that is associated with the combination of the first key and third keys being pressed. In some embodiments, the instructions are further configured to cause the one or more processors to perform operations including: in response to determining that the combination of the first key and the third key are not included as a key trigger in the remapping database: sending, by the one or more processors to the host computing device while the first and third keys are pressed, a fourth make command indicating that the modifier is switched from inactive to active; and sending, by the one or more processors to the host computing device while the first and third keys are pressed, a fifth make command corresponding to a default functional assignment of the third key.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which.

Throughout the drawings, it should be noted that like reference numbers are typically used to depict the same or similar elements, features, and structures.

DETAILED DESCRIPTION

Figure 1:
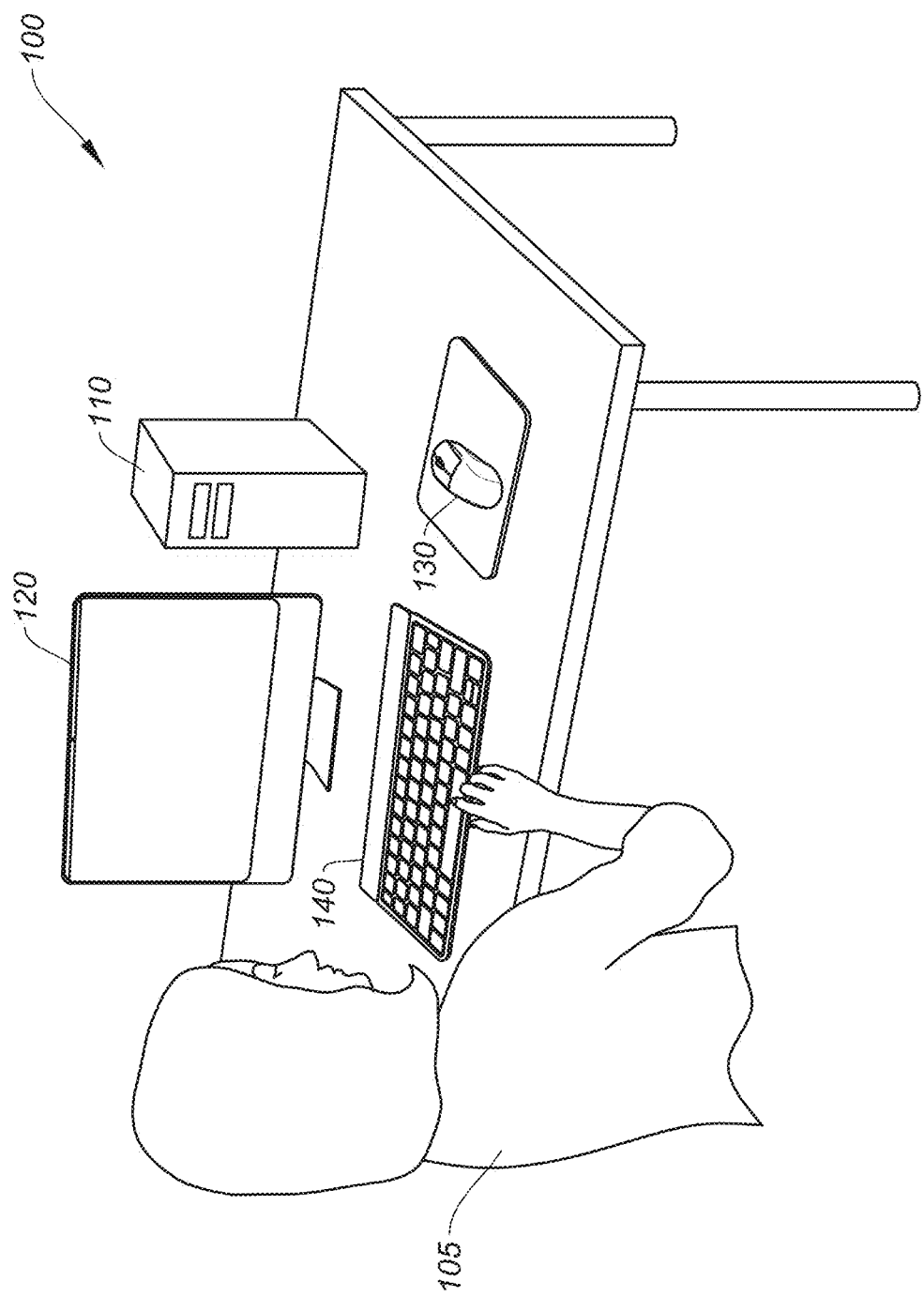
FIG. 1 shows an example of a computer system that can include any of a variety of host computing devices and computer peripheral devices, including computer peripheral devices that can be configured to perform aspects of the various inventive concepts described herein.

Aspects of the present disclosure relate generally to electronic devices, and more particularly to programmable input devices, according to certain embodiments.

In the following description, various examples of programmable input devices are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified to prevent any obfuscation of the novel features described herein.

The following high level summary is intended to provide a basic understanding of some of the novel innovations depicted in the figures and presented in the corresponding descriptions provided below. Aspects of the invention relate to input devices with on-board systems (e.g., firmware) to realize fully customizable keys, buttons, and shortcuts, made possible by assigning new target behaviors to specific trigger keypresses. Further aspects include novel methods of controlling the logistics of sending remapping data via local processing (e.g., firmware) to a communicatively coupled host computing device that results in improved latency, accuracy, reliability, and consistency to make for an improved user experience (UX). Software (SW)-based FKC systems, as found in some conventional devices, often exhibit poor latency and consistency. For instance, the total time from a user key press to a corresponding device report delivery to the host computing device operating system (OS) in SW-based FKC systems can be in the tens to hundreds of milliseconds. Such latencies may go unnoticed with certain applications like audio volume adjustments, but can be catastrophic in certain gaming scenarios (e.g., FPS, driving simulators, etc.) and thus intolerable to modern consumers. Another problem with SW-based FKC systems is behavior at system start up or wake up from a sleep mode. Before gaining access to the OS, a user typically has to enter a password. At this time, the input device would typically be in its default mode of operation because the FKC remapping has not yet been established by the OS and corresponding software. Thus, if the password key sequence was generated on an FKC system using keys that were remapped to different target values, then that same key sequence would produce a different output at startup, resulting in a failed password attempt. In contrast, the novel embodiments described herein are local firmware based systems that have practically no latency between wake/start up and FKC implementation (e.g., <500 μs) resulting in immediate FKC access and still accommodating modern device report rates (e.g., 1 ms) to make for a more reliable, consistent, and improved user experience.

The embodiments described provide a comprehensive full key customization (FKC) framework to address the issues above and further FKC implementation challenges including the logistics of managing FKC-based combo-key triggers, modifier processing, key combo press/release events, modifier processing when chaining combo-keys, suppression and reenabling of modifiers, collisions, parallel keypresses, and more, which are described in detail below.

It is to be understood that this high level summary is presented to provide the reader with a baseline understanding of some of the novel aspects of the present disclosure and a roadmap to the details that follow. This high level summary in no way limits the scope of the various embodiments described throughout the detailed description and each of the figures referenced above are further described below in greater detail and in their proper scope.

Definitions

Full-key customization (FKC): This feature allows a user to customize the actions of one or more keys, buttons, rotary devices, etc., on an input device (e.g., keyboard), such as remapping a key to another key, or program a key to playback a macro, for instance. The novel embodiments of FKC described herein differs from conventional FKC systems in that it can apply to all keyboard keys (e.g., not just designated programmable keys) and can customize modifier+key combo-keys, such as assigning a custom behavior to Ctrl+x, Shift+Ctrl+y, Fn+z, Fn+Ctrl+x, and the like.

Key: This is a physical key or button on an input device (e.g., keyboard).

Modifier: Defined as any of the following functions including: LeftShift, RightShift, LeftCtrl, RightCtrl, LeftAlt, RightAlt, LeftGUI (e.g., "Windows" key), RightGUI (e.g., Context Menu" key), keyboard keys, although some embodiments may designate other modifier keys. In some aspects, left and right modifier keys may not be distinguished and can be considered to be equivalent by the host system (and also by users). For instance, a shortcut can generally be specified as "Ctrl+C" and will work equivalently whether the LeftCtrl or RightCtrl key is used. However, some embodiments may distinguish between left and right modifiers for certain combo-key customizations.

Logical modifier: FKC allows a user to remap any physical key (or combo-key) to a modifier key. For example, a user can remap "(physical) X"→ (to) "(logical) LeftShift" or "(physical) LeftCtrl"→ "(logical) RightAlt." Such remapping assignments are referred to as a "logical" modifier, rather than a physical modifier key, which are by default mapped to their corresponding logical modifier. Logical modifier values can take into account the pressed state of uncustomized physical modifier keys as well as the pressed state of keys that are remapped to modifiers via FKC. Logical modifiers are the values maintained internally in FW for the purpose of matching key triggers.

Combo-key: Also known as a "shortcut" or "hotkey," this is a key combination commonly used in modern operating systems and applications and generally consists of pressing and holding one or more modifiers and then pressing a single non-modifier key to generate a particular output. Some common combo-key examples include "Ctrl"+"C"=copy, and "Ctrl"+ "Alt"+"Delete"=reboot or open task manager. For the purposes of FKC, combo-keys are further defined in greater context in the embodiments described below.

Trigger (key/combo-key): A single control key or shortcut that when pressed is assigned to a custom behavior. Customized keys or combo-keys are also called "trigger" keys.

Target (action/behavior): This is the behavior that can be executed when the user presses a trigger key/combo-key.

Remap: Where the target behavior is different than a default keypress output for a single key or combo-key.

Macro: a target behavior that includes a variable length series of keypresses or consumer codes. Macros can also include delays and other behavior.

G-Keys: G-keys are keys labeled "G1", "G2", etc., that are configured for customization. "G-Keys" are Logitech® features, but can include any customizable key(s).

System Environment

FIG. 1 shows an example of a computer system 100 that can include any of a variety of host computing devices and computer peripheral devices, including computer peripheral devices (e.g., a computer mouse, keyboard, etc.) that can be configured to perform aspects of the various inventive concepts described herein. Computer system 100 shows a user 105 operating a host computing device (shown as a desktop computer) 110 and a number of computer peripheral devices that can be coupled to and/or integrated with the host computing device, including a display device 120, a computer mouse 130, a keyboard 140, and may include any other suitable computer peripheral device (e.g., microphone, speaker(s), docking station, headphones, etc.). Each computer peripheral device 120-140 can be communicatively coupled to host computing device 110.

Although the host computing device is shown as a desktop computer, other types of host computing devices can be used including gaming systems, laptop computers, set top boxes, entertainment systems, tablet or "phablet" computers, stand-alone head mounted displays ("HMD"), or any other suitable host computing device (e.g., smart phone, smart wearable, or the like). In some cases, multiple host computing devices may be used and one or more of the computer peripheral devices may be communicatively coupled to one or more of the host computing devices (e.g., a computer mouse may be coupled to multiple host computing devices). A host computing device may also be referred to herein as a "host computer," "host device," "computing device," "computer," or the like, and may include a machine readable medium (not shown) configured to store computer code, such as driver software, firmware, and the like, where the computer code may be executable by one or more processors of the host computing device(s) to control aspects of the host computing device, for instance via the one or more computer peripheral devices.

A typical computer peripheral device can include any suitable input device, output device or input/output device including those shown (e.g., a computer mouse) and not shown (e.g., remote control, wearables (e.g., gloves, watch, head mounted display), AR/VR controller, CAD controller, joystick, simulation shifter, stylus device, or other suitable device that can be used, for example, to convert analog inputs into digital signals for computer processing. By way of example, a computer peripheral device (e.g., computer mouse 130) can be configured to provide control signals for movement tracking (e.g., x-y movement on a planar surface, three-dimensional "in-air" movements, etc.), touch and/or gesture detection, lift detection, orientation detection (e.g., in 3 degrees-of-freedom (DOF) system, 6 DOF systems, etc.), power management capabilities, input detection (e.g., buttons, scroll wheels, etc.), output functions (e.g., LED control, haptic feedback, etc.), or any of myriad other features that can be provided by a computer peripheral device, as would be appreciated by one of ordinary skill in the art. The buttons of computer mouse 130 and the keys of keyboard 140 (or other depressible element on any input device) may incorporate aspects of full key customization, as presented herein.

An input device may be a computer peripheral device, and may be referred to as either herein, as well as a "peripheral input device," "peripheral," or the like. The majority of the embodiments described herein generally refer to computer peripheral device 140, however it should be understood that a computer peripheral device can be any suitable input/output (I/O) device (e.g., user interface device, control device, input unit, or the like) that may be adapted to utilize the novel embodiments described and contemplated herein.

A System for Operating a Computer Peripheral Device

Figure 2:
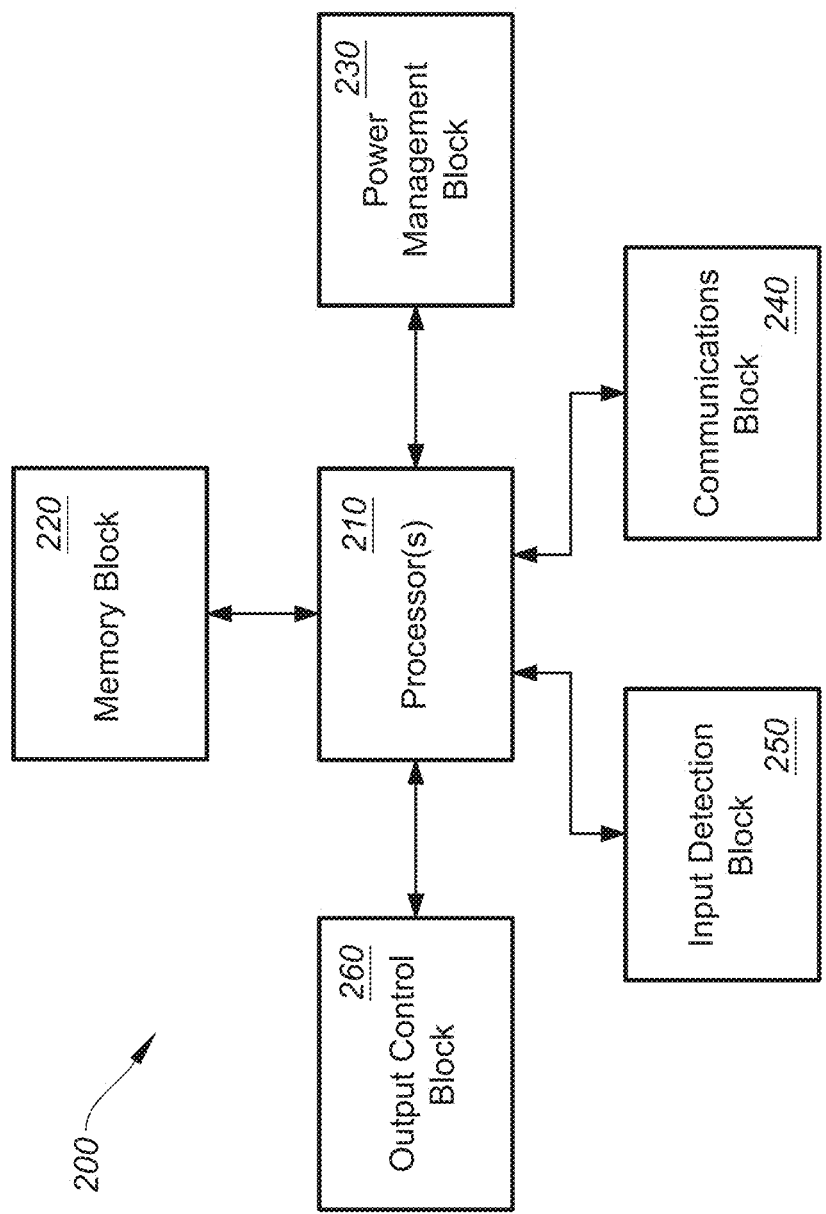
FIG. 2 shows a simplified block diagram of a system configured for operating an input device, according to certain embodiments.

FIG. 2 shows a system 200 for operating a computer peripheral device (e.g., computer mouse 130, keyboard 140, etc.), according to certain embodiments. System 200 may be configured to operate any of the computer peripheral devices specifically shown or not shown herein but within the wide purview of the present disclosure. System 200 may include processor(s) 210, memory block 220, a power management block 230, a communications block 240, an input detection block 250, and an output control block 260. Each of the system blocks 220-260 can be in electronic communication with processor(s) 210 (e.g., via a bus system). System 200 may include additional functional blocks that are not shown or discussed to prevent obfuscation of the novel features described herein. System blocks 220-260 (also referred to as "modules," "systems," or "system blocks") may be implemented as separate modules, or alternatively, more than one system block may be implemented in a single module. In the context described herein, system 200 can be incorporated into any computer peripheral device described or mentioned herein and may be further configured with any of the full key customization implementations presented herein, as described below at least with respect to FIGS. 4-12, as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of computer peripheral device 140 (e.g., system block 220-260). Alternatively or additionally, some of system blocks 220-260 may include an additional dedicated processor, which may work in conjunction with processor(s) 210. For instance, MCUs, µCs, DSPs, and the like, may be configured in other system blocks of system 200. Communications block 240 may include a local processor, for instance, to control aspects of communication with host computer 110 (e.g., via Bluetooth, Bluetooth LE, RF, IR, hardwire, ZigBee, Z-Wave, Logitech Unifying, or other communication protocol). Processor(s) 210 may be local to the peripheral device (e.g., contained therein), may be external to the peripheral device (e.g., off-board processing, such as by a corresponding host computing device), or a combination thereof. Processor(s) 210 may perform any of the various functions and methods (e.g., "device" actions of FIGS. 4-12, methods 900-1200) described and/or covered by this disclosure in conjunction with any other system blocks in system 200. In some implementations, processor 302 of FIG. 3 may work in conjunction with processor 210 to perform some or all of the various methods described throughout this disclosure. In some embodiments, multiple processors may enable increased performance characteristics in system 200 (e.g., speed and bandwidth), however multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for execution by processing devices (e.g., processor(s) 210). Software can be implemented as a single program or a collection of separate programs and can be stored in non-volatile storage and copied in whole or in-part to volatile working memory during program execution. In some embodiments, memory 220 may store data corresponding to inputs on the peripheral device, such as a detected movement of the peripheral device sensor (e.g., optical sensor, accelerometer, etc.), activation of one or more input elements (e.g., buttons, sliders, touch-sensitive regions, etc.), or the like. Stored data may be aggregated and send via reports to a host computing device.

In certain embodiments, memory 220 can store the various data described throughout this disclosure. For example, memory 220 can store and/or include instructions configured to perform the various FKC controlling schemas presented herein. Memory 220 can be used to store any suitable data to perform any function described herein and as would be appreciated by one of ordinary skill in the art with the benefit of this disclosure. Memory array 220 can be referred to as a storage system or storage subsystem, and can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute to run various operations (e.g., software-controlled switches, etc.) as described herein.

Power management system 230 can be configured to manage power distribution, recharging, power efficiency, haptic motor power control, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications block 240, etc.). In certain embodiments, the functions provided by power management system 230 may be incorporated into processor(s) 210. Alternatively, some embodiments may not include a dedicated power management block. For example, functional aspects of power management block 240 may be subsumed by another block (e.g., processor(s) 210) or in combination therewith. The power source can be a replaceable battery, a rechargeable energy storage device (e.g., super capacitor, Lithium Polymer Battery, NiMH, NiCd), a corded power supply, or other suitable power source. The recharging system can be an additional cable (specific for the recharging purpose) or it can use a USB connection to recharge the battery.

Communication system 240 can be configured to enable wireless communication with a corresponding host computing device (e.g., 110), or other devices and/or peripherals, according to certain embodiments. Communication system 240 can be configured to provide radio-frequency (RF), Bluetooth®, Logitech proprietary communication protocol (e.g., Unifying, Gaming Lightspeed, or others), infra-red (IR), ZigBee®, Z-Wave, or other suitable communication technology to communicate with other computing devices and/or peripheral devices. System 200 may optionally comprise a hardwired connection to the corresponding host computing device. For example, input device 130 can be configured to receive a USB, FireWire®, Thunderbolt®, or other universal-type cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection module 250, output control module 260, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 GHZ), etc. One of ordinary skill in the art with the benefit of this disclosure would appreciate the many modifications, variations, and alternative embodiments thereof.

Input detection module 250 can control the detection of a user-interaction with input elements (also referred to as "elements") on an input device. For instance, input detection module 250 can detect user inputs from keys or buttons (e.g., depressible elements), roller wheels, motion sensors, scroll wheels, track balls, touch pads (e.g., one and/or two-dimensional touch sensitive touch pads), click wheels, dials, keypads, microphones, GUIs, touch-sensitive GUIs, proximity sensors (e.g., IR, thermal, Hall effect, inductive sensing, etc.) image sensor based detection such as gesture detection (e.g., via webcam), audio based detection such as voice input (e.g., via microphone), or the like, as would be appreciated by one of ordinary skill in the art with the benefit of this disclosure. Alternatively, the functions of input detection module 250 can be subsumed by processor 210, or in combination therewith.

In some embodiments, input detection module 250 can detect a touch or touch gesture on one or more touch sensitive surfaces on input device 130. Input detection block 250 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of computer peripheral device 150 may or may not utilize touch detection or touch sensing capabilities.

Input detection block 250 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, strain gages, etc.), capacitive sensors (e.g., surface capacitance, self-capacitance, mutual capacitance, etc.), optical sensors (e.g., light barrier type (default open or closed), infrared light barriers matrix, laser-based diode coupled with photo-detectors that could measure the time of flight of the light path, etc.), acoustic sensors (e.g., piezo-buzzer coupled with microphones to detect the modification of a wave propagation pattern related to touch points, etc.), inductive sensors, magnetic sensors (e.g., Hall Effect, etc.), or the like.

In some embodiments, output control module 260 can control various outputs for a corresponding computer peripheral device. For instance, output control module 260 may control a number of visual output elements (e.g., LEDs, LCD screens), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein. It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., computer peripheral devices) implemented using any combination of circuitry and software. Furthermore, aspects and/or portions of system 200 may be combined with or operated by other sub-systems as required by design. For example, input detection block 250 and/or memory 220 may operate within processor(s) 210 instead of functioning as a separate entity. In addition, the inventive concepts described herein can also be applied to any electronic device. Further, system 200 can be applied to any of the computer peripheral devices described in the embodiments herein, whether explicitly, referentially, or tacitly described (e.g., would have been known to be applicable to a particular computer peripheral device by one of ordinary skill in the art). The foregoing embodiments are not intended to be limiting and those of ordinary skill in the art with the benefit of this disclosure would appreciate the myriad applications and possibilities.

System for Operating a Host Computing Device

Figure 3:
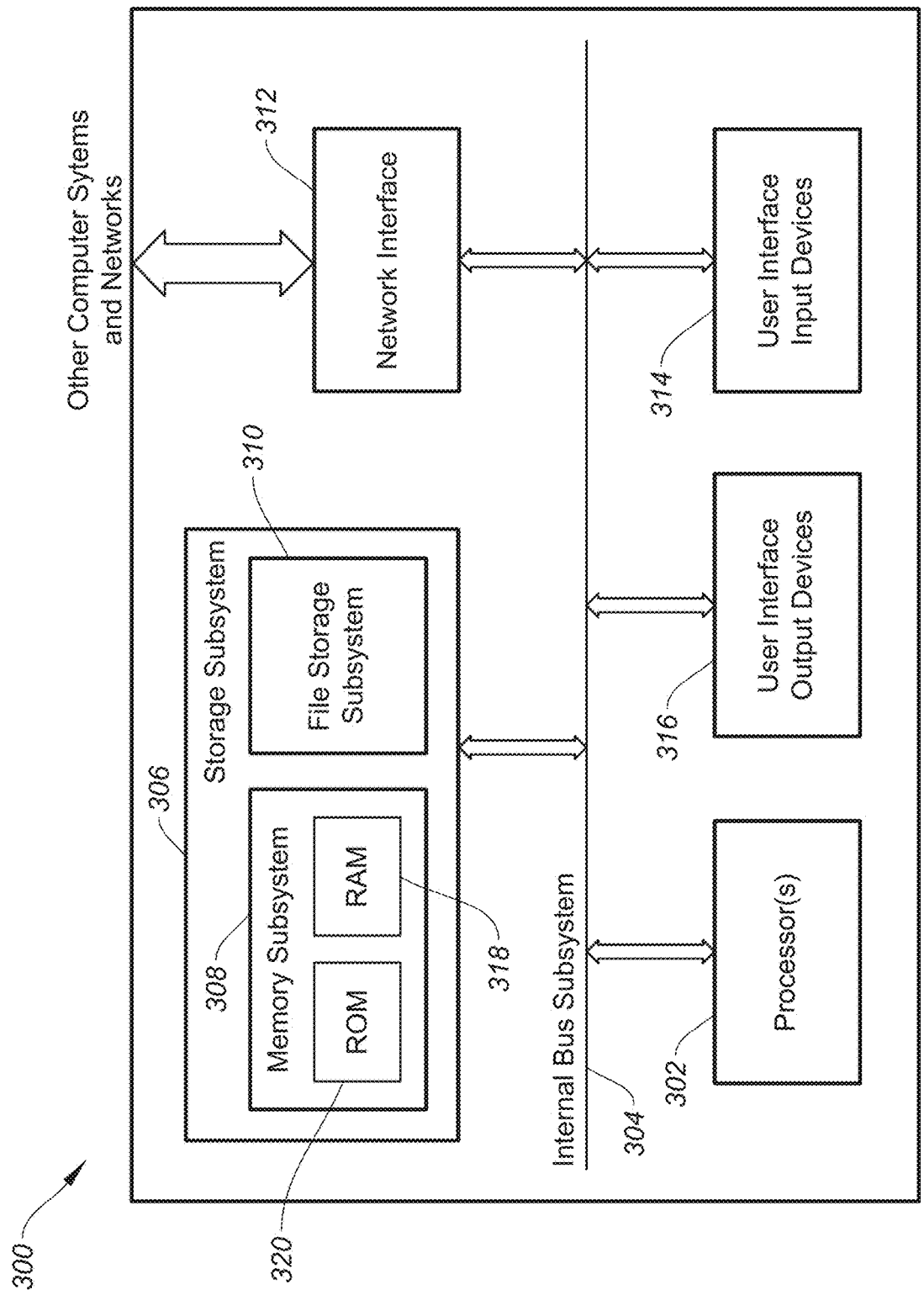
FIG. 3 shows a simplified block diagram of a system for operating a host computing device, according to certain embodiments.

FIG. 3 is a simplified block diagram of a host computing device 300, according to certain embodiments. Host computing device 300 can implement some or all functions, behaviors, and/or capabilities described above that would use electronic storage or processing, as well as other functions, behaviors, or capabilities not expressly described. Host computing device 300 can include a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, host computing device 300 can be implemented in any suitable computing device, such as a desktop or laptop computer (e.g., desktop 110), mobile device (e.g., tablet computer, smart phone, mobile phone), gaming console, wearable device, media device, or the like, or in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., surface classification) may be performed by software stored in storage subsystem 306, stored in memory 220 of a computer peripheral device, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a host computing device 110 to perform corresponding actions. The instructions may be configured to run in sequential order, in parallel (such as under different processing threads), or in a combination thereof. After loading a code module on a general purpose computer system, the general purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as a display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Full Key Customization

As described above, aspects of the invention relate to input devices with on-board systems (e.g., firmware) to realize fully customizable keys, buttons, and shortcuts, made possible by assigning new target behaviors to specific trigger keypresses via local processing (e.g., firmware) using novel processing methodologies further described below. The remapped target data is sent to a communicatively coupled host computing device in a manner that results in excellent low latency (e.g., sub-millisecond reporting), accuracy, reliability, and consistency (e.g., FKC applied immediately at wake up/power up) to make for an improved UX.

The following embodiments described provide a novel and comprehensive full key customization (FKC) framework to address the issues above and further FKC implementation challenges including the logistics of managing FKC-based combo-key triggers, modifier processing, key combo press/release events, modifier processing when chaining combo-keys, suppression and reenabling of modifiers, collisions, parallel keypresses, and more, which are described in detail below. At a high level, FKC distinguishes three independent layers, each with similar behavior and capabilities including a base layer, FN layer, and GShift layer. Some embodiments may have fewer or more layers, as would be appreciated by one of ordinary skill in the art with the benefit of this disclosure. Within each layer, trigger keypresses can be of two types including single keys and combo-keys. Target actions/behaviors can be of multiple types including a remap to another key or shortcut, a macro, a button press, and more. The modifiers specified in the target action can be optionally used to update the list of pressed logical modifiers. In so doing, the trigger key can be used to press one or more logical modifiers which can, in turn, be used to construct a trigger shortcut. Trigger keypress and key release events can be optionally notified to software operating on the host computing device ("host SW"). This can be used, for example, to implement target actions in the host SW. In some aspects, GShift and FN can be supported as system-wide layer selectors, meaning that the user can press GShift on one device (e.g., computer mouse 130) and expect the GShift layer behavior when pressing keys on a second device (e.g., keyboard 140).

Figure 4:
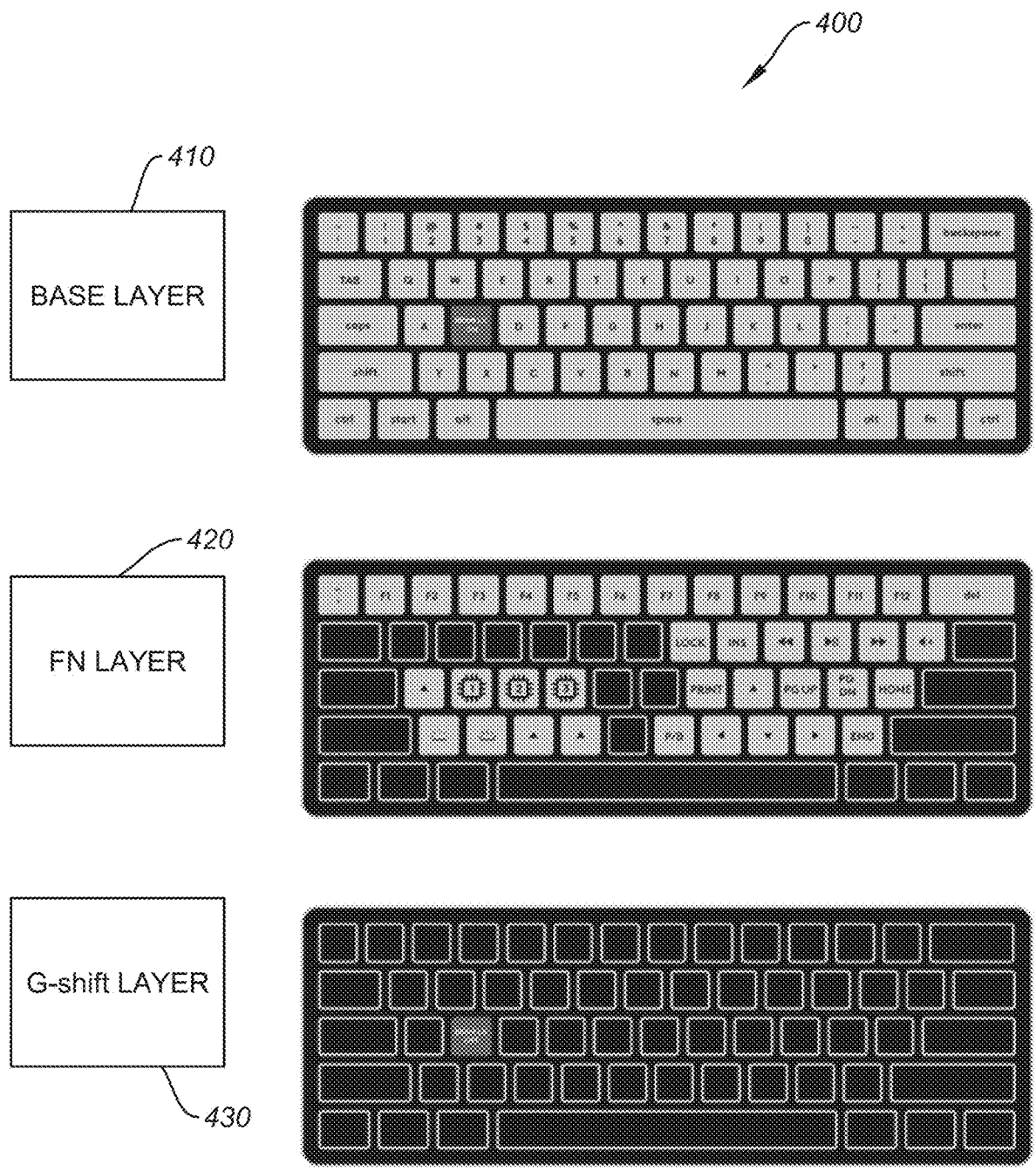
FIG. 4 shows examples of a base layer, FN layer, and GShift layer in an input device that utilizes an FKC system, according to certain embodiments.

FIG. 4 shows examples of a base layer, FN layer, and GShift layer in an input device (e.g., keyboard 400, 140) that utilizes an FKC system, according to certain embodiments. The base layer 410 includes keys that are accessible directly without pressing a layer modifier (e.g., FN, GShift)). The FN layer 420 are keys that are accessible when holding the FN modifier down, also referred to as a "function key" layer. The GShift layer 430 are keys that are accessible when holding the GShift modifier down. Referring to FIG. 4, assignments are made on the same key on the base layer and GShift layers, but not the FN layer.

Figure 5:
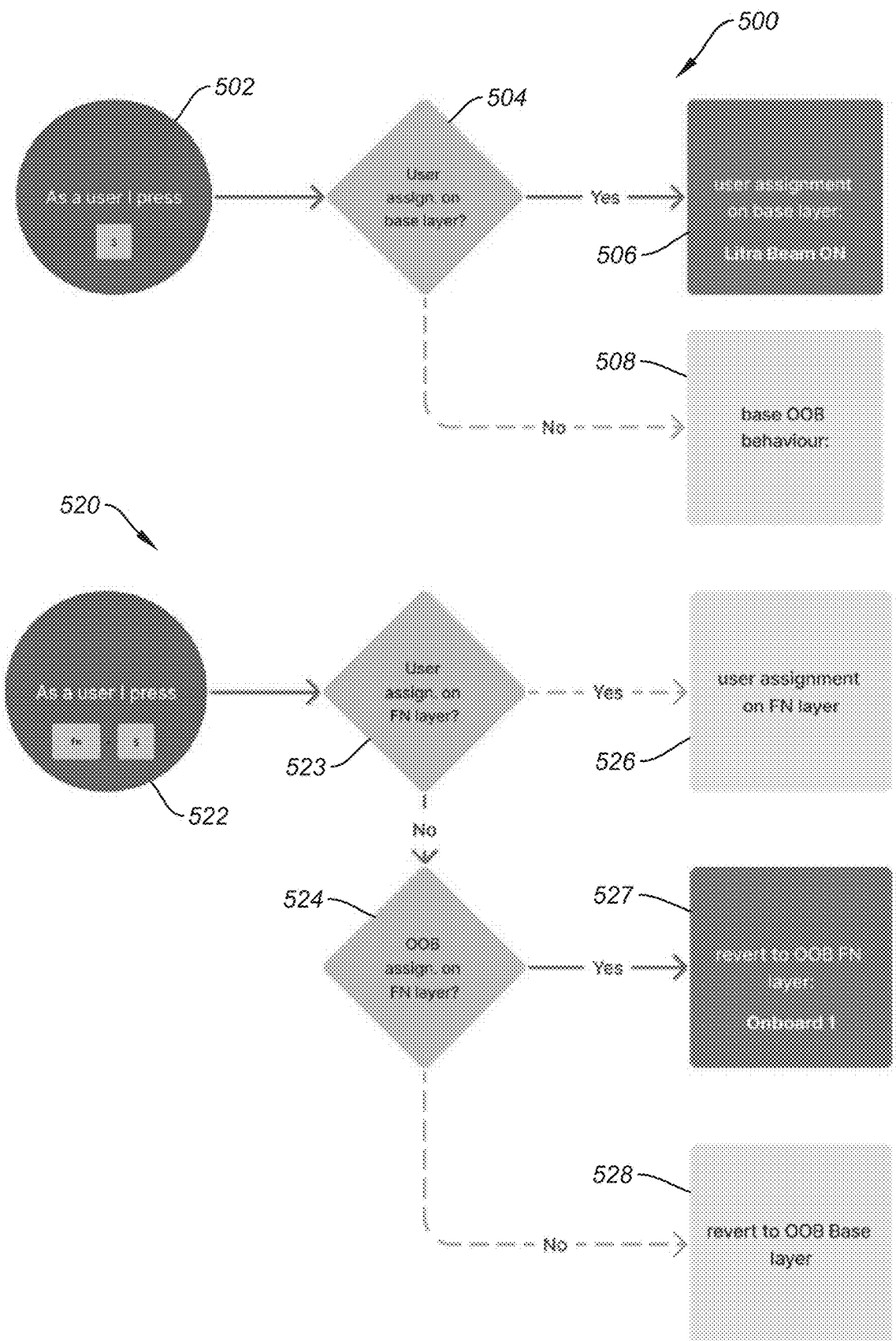
FIGS. 5 and 6 show logical outcomes for certain key press combinations on a keyboard, according to certain embodiments.
Figure 6:
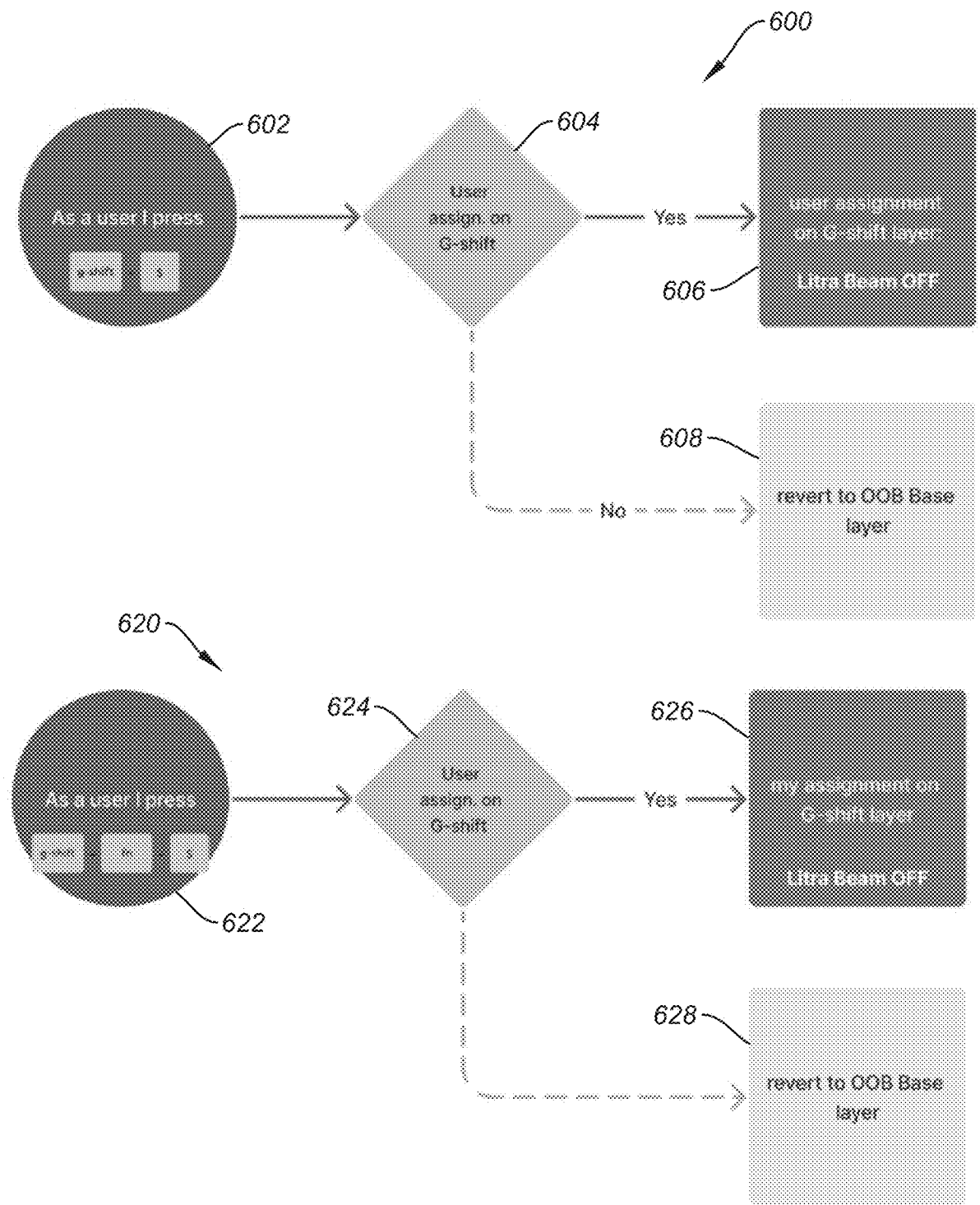

FIGS. 5 and 6 show logical outcomes for certain key press combinations on an FKC-enabled keyboard 400, according to certain embodiments. In FIG. 5, flowchart 500 shows that a user presses the 's' key (operation 502). FKC keyboard 400 determines that a user assigned the 's' key on the base layer to a different target (operation 504). That is, the 's' key on the base layer is the trigger, and the target is something other than the default 's' alphanumeric character because, for instance, the user may have programmed that key to a different function (e.g., turn on a communicatively-coupled lighting apparatus). Thus, when the base layer 410 's' key is pressed, the user assignment on the base layer is activated (operation 506). If no customization was made to the 's' key on the base layer, then the default target output (also referred to as "out of the box" or "OOB" behavior) is performed (operation 508).

Flowchart 520 shows that a user presses a combination of the 'FN' and 's' keys (operation 522). At operation 524, FKC keyboard 400 determines that a user did not assign the 's' key on the FN layer to a different target, and that combination by default (OOB) is programmed to select "onboard 1," which corresponds to a manual selection of one or more host computing devices communicatively coupled to keyboard 400 (e.g., onboard 1, 2, 3 may cause keyboard 400 to switch to a different corresponding host computing device) (operation 524). That is, the combination of the 's' key and 'FN' keys on the FN layer is not a user-programmed trigger, and the target is a default instruction (onboard 1) corresponding to a selection of a host computing device. Thus, when the FN layer 420 's' key is pressed, no user assignment on the FN layer is activated (operation 526), and the default assignment to 'FN+s" is output (operation 527). If no user customization was made to the 's' key on the FN layer, and no default value as assigned to that combination, then either nothing happens or the system may revert to the default base layer (e.g., alphanumeric 's' output) (operation 528).

In FIG. 6, flowchart 600 shows that a user presses a combination of the 'GShift' and 's' keys (operation 602). At operation 604, FKC keyboard 400 determines that a user assigned the 's' key on the GShift layer to a different target. That is, the 's' key on the GShift layer is the trigger, and the target is an output that turns off the communicatively-coupled lighting apparatus. Thus, when the GShift layer 430 's' key is pressed, the user assignment on the GShift layer is activated (operation 606). If no customization was made to the 's' key on the Gshift layer, then the default target output (also referred to as "out of the box" or "OOB" behavior) is performed (operation 608). In some cases, if no GShift OOB assignment applies, they system may revert to OOB base layer assignment (e.g., an alphanumeric 's' output).

Flowchart 620 shows that a user presses a combination of the 'GShift", 'FN', and 's' keys (operation 622). At operation 624, FKC keyboard 400 determines that a user assigned the 's' key on the GShift layer to a different target. Furthermore, since both GShift and FN layers are enabled, the GShift layer applies, although some embodiments may differ in the hierarchy of modifiers. As such, the 's' key on the GShift layer is the trigger, the FN layer is ignored, and the target is an output that turns off the communicatively-coupled lighting apparatus. Thus, when the GShift layer 430 's' key is pressed, the user assignment on the GShift layer is activated (operation 626). As noted above, in some cases if no GShift OOB assignment applies, the system may revert to the OOB base layer assignment of the 's' output (operation 628).

FKC Implementation

In order to provide a robust, FW-based FKC implementation that provides consistent performance across myriad applications with excellent latency and immediate FKC functionality at start up/wake up, many engineering challenges needed to be solved, including defining broad-use combo-key triggers, modifier processing (e.g., suppression and re-enabling), combo-key press and release events, chaining combo-keys, collisions, and more, which are respectively addressed below.

Defining Combo-Key Triggers

In the context of FKC, combo-key triggers can be specified as a combination of one or more logical modifier keys (e.g., LeftShift), and any single physical key/button (e.g., 's' key). A combo-key trigger occurs when the user presses the specified single physical key/button while the specified logical modifier keys are being held down. Thus, for example, the user should expect to be able to customize the following key trigger/target mappings:

1. Remap "(logical) LeftShift"+"x"→"1"
2. Remap "(logical) LeftShift"+"(logical) RightAlt"+"x"→"2"
3. Remap "(logical) LeftShift"+"x"→"LeftCtrl"

Not so intuitively, the user can also customize:

4. Remap "(logical) LeftShift"+"(physical) LeftAlt"→"x"
5. Remap "(logical) LeftShift"+"(physical) volume-up (button)"→"y"

Examples #4 and #5 are valid combo-keys for the purpose of FKC, as a combo-key can be built on any physical key or button, even if that physical key is a physical modifier key (in this example: LeftAlt), or a physical button.

Modifier Processing (Modifier Suppression)

In some embodiments, users can remap "combo-keys" (e.g., modifier+key combinations) to any other key or key sequence. A design parameter is that this should work with any number of modifiers. A challenge for example 1 (above) is that if we intercept the "x" keypress and substitute it with "1" keypress, then the output would be Shift+ "1" which would produce "!" (on a US keyboard) and not "1." Thus, a different way is needed to nullify the modifier key(s) that are already being held down by the user.

One option is to postpone sending a modifier(s) to the host until it is determined that the underlying combo-key is not customized. This method if not optimal as it widely impacts the keyboard behavior even if the user is not pressing a customized key or shortcut. In other words, modifier keys may be suppressed even if non-customized key triggers are being used, which can significantly impact the latency of the FKC system. Further, some applications (e.g., games) use modifier keypress events directly, so not sending them immediately would be unacceptable to many contemporary users.

A better option (and used in FKC) is to send the modifiers immediately after being pressed, but artificially suppressing them if the underlying combo-key is subsequently determined to be customized. In preferred embodiments, the artificial suppression of modifiers should be done directly by the device itself and not via SW running on a host computing device because for many gaming applications, the remap target key(s) must be sent with minimal latency, and the modifier should be suppressed before sending the remap target key(s). Furthermore, it is likely technically infeasible for a host SW to consistently inject a key release signal by means of a "virtual" keyboard that would reliably suppress the modifier.

In some embodiments, if the remap target contains a modifier that is also present in the customized combo-key, then that modifier is not suppressed by FKC. For example, if the user customized "LeftCtrl"+"c"→"LeftCtrl"+"x", then the "LeftCtrl" modifier should not be suppressed.

Combo-Key Press and Release Events

When supporting combo-key triggers, a challenge is determining when to consider that a combo-key has been "pressed" and "released," and when to "press" and "release" the corresponding remap target. Note that the combo-key is based on multiple underlying key presses: the logical modifier key(s) and the main physical key. In FKC, a combo-key press occurs when the non-modifier key (e.g., main physical key) is pressed and the release is when that same non-modifier key is released. In some embodiments, releasing modifier keys will not release the underlying combo-key trigger. Similarly, releasing the logical layer selection keys (e.g., logical FN and logical GShift) does not release the underlying combo-key (or single key) trigger.

Modifier Processing (Chaining Combo-Keys)

In some cases, a user may want to "chain" a combo-key. For example, the user may want to perform a copy/paste commend in quick succession by pressing in sequence "Ctrl+C" and :Ctrl+V," without releasing and re-pressing the Ctrl key in between each combo-key. In some combo-key chains, some combo-keys may be customized and others may not be customized. This has several implications. If the FKC system ("FKC") artificially suppressed a modifier and the user presses a non-customized combo-key, then FKC will need to un-suppress it. FKC further needs to keep track of the "logical" modifier state as separate from the modifier press/release signals sent to the host computer ("host") OS.

Un-Suppressing Modifiers

In some embodiments, un-suppressing a modifier(s) may occur when the user releases the underlying physical trigger key. However, this is not a preferred option, particularly in cases where the target key(s) is a macro, or if it is a remapping that is implemented in the host SW, because the macro (or host SW remap) could take too much time to execute. If FKC un-suppresses the modifier early, then it will likely interfere with the delayed execution of the macro/remap function. For example, if the user configures "LeftCtrl"+"x"→"a,b,c,d,e,f" (macro), then when the user presses "x" while logical LeftCtrl is being depressed, FKC will suppress the LeftCtrl modifier and start the execution of the macro. The user will subsequently release the "x" and if LeftCtrl is immediately un-suppressed, then the macro might be impacted such that the OS might interpret the sequence as: "a", "b", "LeftCtrl+c", "LeftCtrl+d", "LeftCtrl+e", "LeftCtrl+f," as opposed to the correct output of "a,b,c,d,e,f."

A better option is to configure FKC such that modifier un-suppression should not occur when releasing the "x", and instead only if/when the user presses a subsequent key. For example, consider the following sequence: (1) user presses and holds "LeftCtrl"; (2) user presses "x"→FKC suppresses LeftCtrl and starts macro; (3) user releases "x"; and (4) user presses "y"→FKC un-suppresses "LeftCtrl" and sends "y."

Collisions

A collision may occur when the user presses a modifier key(s) during a macro playback, resulting in undesired behavior. In some cases, collisions can also occur with remaps when implemented via host SW, rather than on the computer peripheral device (e.g., via FW), because the relative timing of local keypresses and keypresses injected by the host SW may collide due to communication latency, as described above. For example, a user may configure "a" to be remapped to "x." In host SW implementations, if the user then presses and releases "a" and immediately presses "LeftShift" thereafter, the injection of "x" may be delayed to a time after "LeftShift" is pressed, resulting in an unintended upper case "X" output. Also, the "un-suppression" of modifiers can also result in a collision in host SW implementations of key remapping systems.

Some general design guidelines that can help minimize the risk of collisions include implementing remaps locally on the computer peripheral device (e.g., local FW-based FKC), implementing macros on the computer peripheral device ("input device") if possible (e.g., to minimize latency), and un-suppressing modifiers when the user presses a subsequent key. In some implementations, a user can flag a macro such that the input device blocks all other keypresses and modifier keypresses until the macro has completed, and such that the macro should immediately cease execution as soon as the user presses another key.

Parallel Keypresses

A parallel keypress occurs when a user presses and releases different keys that are remapped to the same target key. Aspects of FW-based FKC can address this scenario in a more reliable and consistent manner than conventional systems. For example, the user may remap: "a"→"x" and "b"→"x." Consider the following sequence: (1) The user presses and holds "a"→Device sends "x"; (2) The user presses "b"→no action ("x" already sent); and (3) The user releases "b"→outcome? Some options include having "x" get released immediately, or waiting until the user releases "a." Some exemplary FKC implementations release the target as soon as the user releases any of the trigger keys.

Implicit Trigger Matching

In some embodiments, the FKC UX is configured such that if the user remaps a single trigger key to a single target key, then that remapping occurs even if the user is holding down one or more modifiers when pressing the trigger key. This is referred to as "implicit" trigger matching, which differs from explicit matching that would have an exact match of all trigger keys, including modifier keys. For example, if a user remaps "a"→"x" then an expectation will be that pressing "Shift"+"a" should result in "Shift"+"x" (uppercase X). In some aspects, implicit trigger matching may not apply between layers. Thus, in the example above, if the user presses "Fn"+"a", or "G-Shift"+"a", then no match will result, implicit or otherwise. More generally, FKC may be configured such that implicit matching does not occur when the user has specified a combo-key trigger (only an exact match applies in that case), or when the target is not a single key (e.g., the target is a macro). However, some embodiments may employ a more flexible policy where implicit trigger matching can apply to any type of trigger/target, including macros.

Notifying Host Computing Device SW

In some embodiments, certain customized behaviors may need the host SW to execute. For example, injecting an emoji or starting a particular application or game would involve the host SW. Thus, aspects of the present FW-based FKC provide a flexible way of notifying the host SW of a particular customized key trigger (e.g., single key or combo-key) press and release. Reiterating the material importance of latency in FKC, and assuming that the user may press multiple keys, a flexible system for sending multiple notifications in parallel to the host SW is implemented in FKC referred to as a dual event system that includes both a bitfield based event system, where each bit represents a different trigger in the FKC settings table (also referred to as a key remapping database), and list-based system, where each trigger event is represented by a separate byte. The list-based approach may be used when there are few keys being pressed at the same time. The resulting short HID++message can be piggy-backed on the underlying HID message. For scenarios where more customized keys are being pressed, then the bitfield approach can support up to 128 simultaneous keypress events. Some embodiments may use only one of the two systems and some bitfields may support other total simultaneous keypress events, as would be appreciated by one of ordinary skill in the art with the benefit of this disclosure.

Layering Concept

In some embodiments, multiple layers are implemented in FKC. As described above, the three layers include a base layer, FN layer, and GShift layer. The layer that is applied depends on if and which of the logical Fn or logical GShift keys are being held down at the time. In some cases, the GShift layer may apply across multiple devices (e.g., a user can assign a button on mouse 130 to GShift, which can enable GShift on keyboard 140). In some embodiments, implicit matching may be applied within a given layer, and not between layers. Each layer may be configured via a similar configuration table (e.g., key remapping database and see FIG. 8), and may be entirely interchangeable. In some cases, layers can have a specific default behavior if not customized, as shown in FIG. 7.

Figure 7:
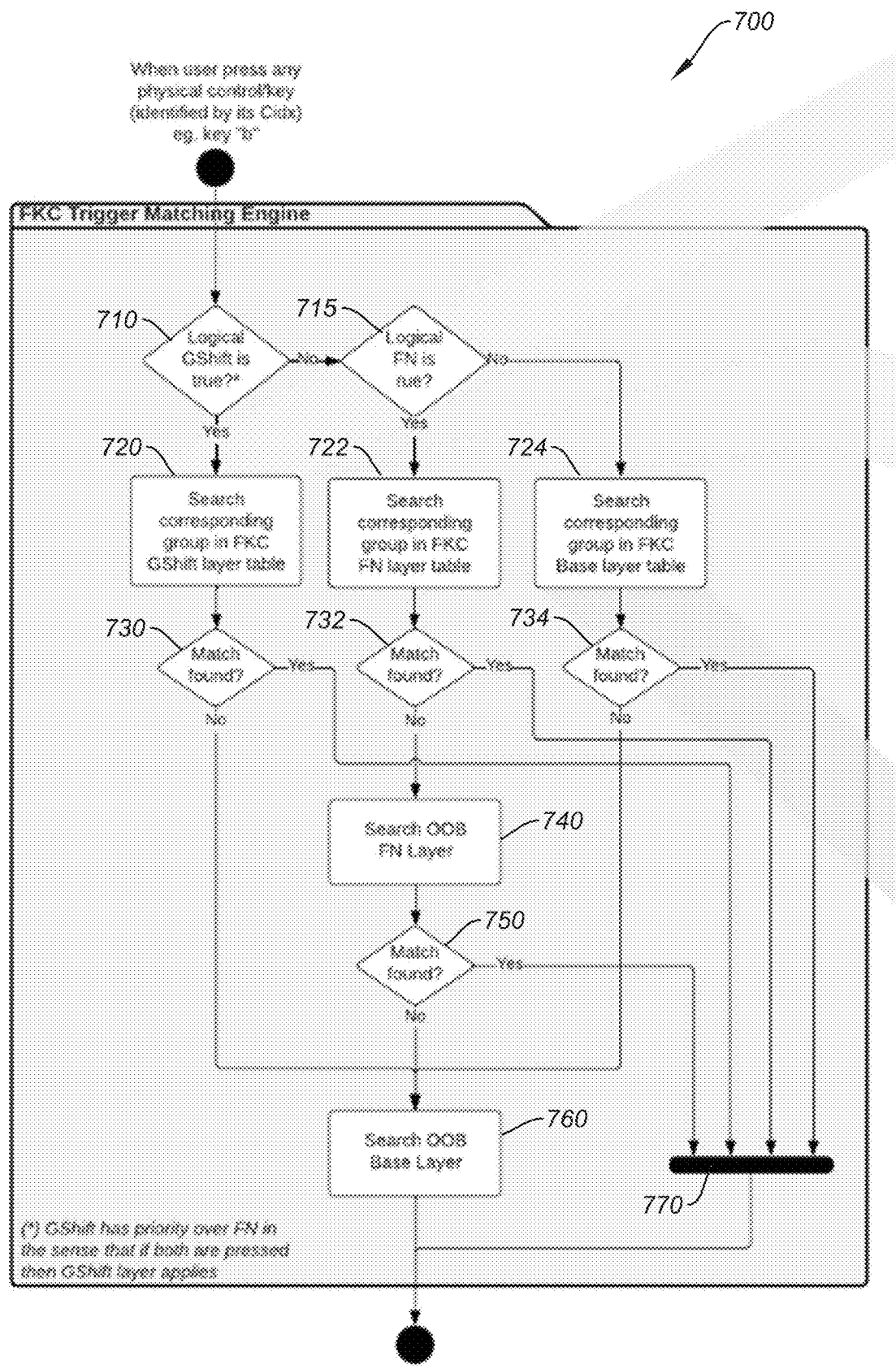
FIG. 7 is a simplified flow chart showing aspects of a method for FKC trigger matching, according to certain embodiments.

FIG. 7 is a simplified flow chart 700 showing aspects of a method 700 for FKC trigger matching, according to certain embodiments. Method 700 can be performed by processing logic that may comprise hardware (circuitry, dedicated logic, etc.), software operating on appropriate hardware (such as a general purpose computing system or a dedicated machine), firmware (embedded software) on an input device, or any combination thereof. In certain embodiments, method 700 can be performed by aspects of system 200 (e.g., processor 210 and memory block 220), system 300, or a combination thereof.

At operation 710, method 700 can include determining whether a logical GShift is pressed, and when true, searching a corresponding group in an FKC GShift layer table (see, e.g., FIG. 8) for a match (operation 720). At operation 730, when a match is found, FKC implements (e.g., sends the key target to the host computing device) the remapped key target indicated in the GShift layer table 810 (operation 770). At operation 730, when a match is not found, a default (OOB) base layer is searched and a corresponding assignment is sent to the host computing device.

At operation 710, when the logical GShift is false (not pressed), method 700 continues by determining whether a logical FN is pressed (operation 715). When true, method 700 includes searching a corresponding group in an FKC FN layer table (see, e.g., FIG. 8) for a match (operation 722). At operation 732, when a match is found, FKC implements the remapped key target indicated in the FN layer table 820 (operation 770). At operation 732, when a match is not found, a default (OOB) FN layer is searched (operation 740). At operation 750, when a match is found, FKC proceeds with sending a corresponding assignment is sent to the host computing device. At operation 750, when a match is not found, a default (OOB) base layer is searched (operation 760) and a corresponding assignment is sent to the host computing device.

At operation 516 when a logical FN is false (no pressed), method 700 continues with searching a corresponding group in an FKC base layer table (operation 724).

At operation 734, when a match is found, FKC implements the remapped key target indicated in the FN layer table 830 (operation 770). At operation 734, when a match is not found, a default (OOB) FN layer is searched (operation 740).

It should be appreciated that the specific steps illustrated in FIG. 7 provide a particular method 700 for FKC trigger matching, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

Figure 8:
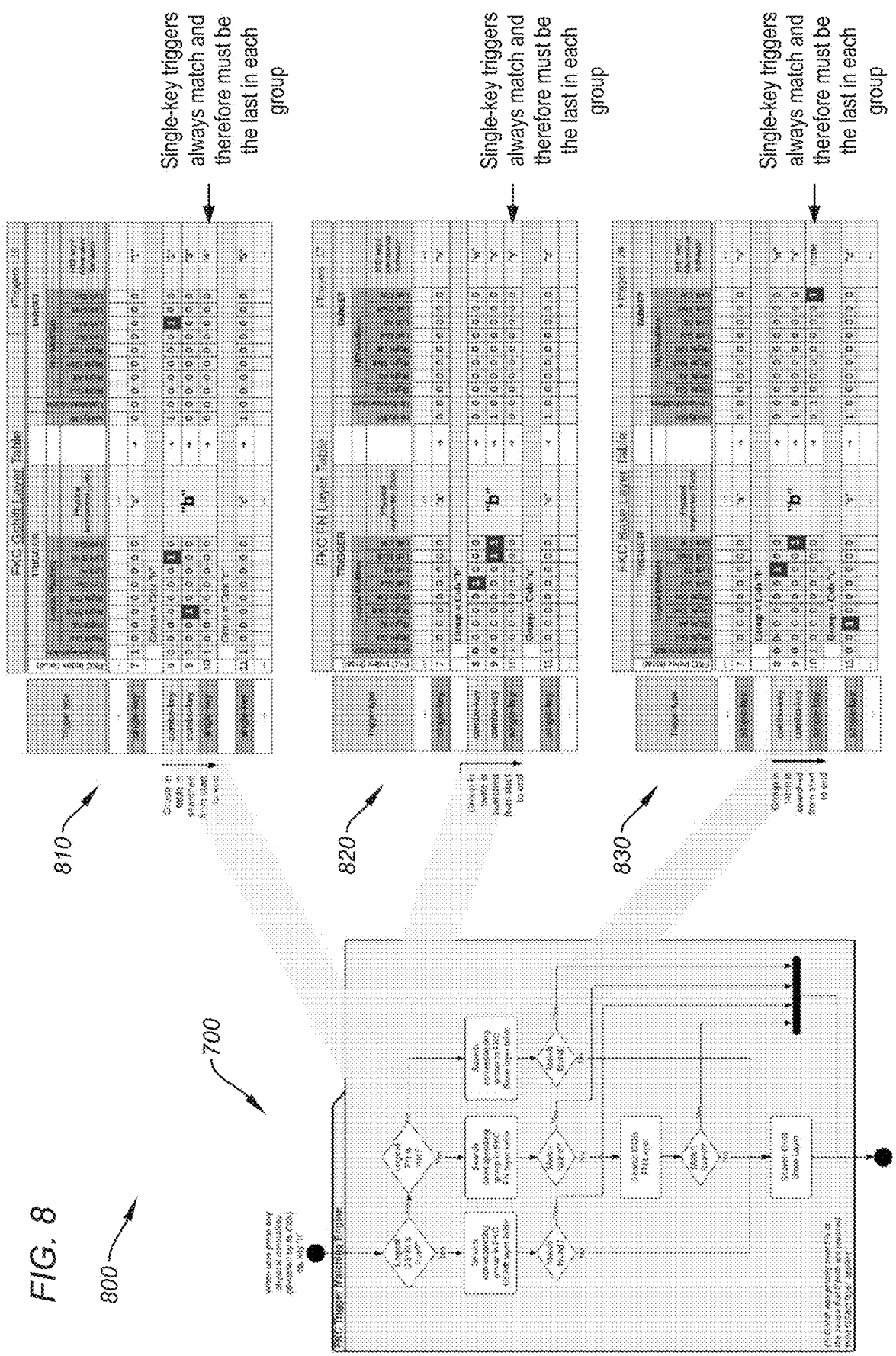
FIG. 8 shows a look up table for multiple layers in an FKC-enabled input device, according to certain embodiments.

FIG. 8 shows a look up table 800 for multiple layers in an FKC-enabled input device, according to certain embodiments. Table 800 includes FKC Gshift layer table 810, FKC FN layer table 820, and FKC base layer table 830. The table for each layer includes a trigger and target matrix. The trigger matrix stores a number of FKC triggers (e.g., user defined) that include one or more logical modifiers and non-modifiers. The target matrix stores corresponding FKC targets comprised of any combination of modifiers and non-modifiers (e.g., HID commands). Each trigger/target set can be indexed to enable searching.

Notifying SW of Presses and Releases of Trigger Keys

Many FKC target behaviors can be implemented in the input device itself, however some cannot as they require the host SW to execute (e.g., emojis, launching applications, etc.). In some cases, some applications may be enabled by allowing the host SW to have knowledge of pressing and releasing particular trigger keys. Thus, some embodiments may employ the following FKC policies: The host SW can configure the device to send a notification when the user presses and releases any FKC trigger, the host SW can configure FKC triggers to have no local target behavior, and/or notifications can occur in parallel to local target behavior. In some aspects, FKC can be configured by means of a table (see, e.g., FIG. 8) within the key remapping database. Each row in the table may contain a particular key trigger and associated behavior. In some embodiments, the host SW can assign an arbitrary trigger index to each row, which can be used to identify the trigger when notifying the host SW. In some cases, two types of events are supported including a short event and a long event. When a low number of trigger keys are being pressed (e.g., <=3), the short event is applied, which can piggyback on the underlying HID event, thus avoiding introducing any additional latency. If a relatively higher number of trigger keys are being pressed (e.g., >3), then a bitfield type, long event format can be used, which can concurrently notify the host SW of up to 128 separate trigger key presses and releases, which allows the FKC system to maintain at least a 26-key rollover at all times.

Enabling/Disabling FKC

In the FKC UX, a user can enable and disable FKC, either via host SW (e.g., Logitech's G HUB®) or via pressing FKC toggle hotkeys on the corresponding input device. When the user disables FKC, the input device FW may circumvent the FKC processing entirely.

Input Device and Host Computer FKC Implementation

Figure 9:
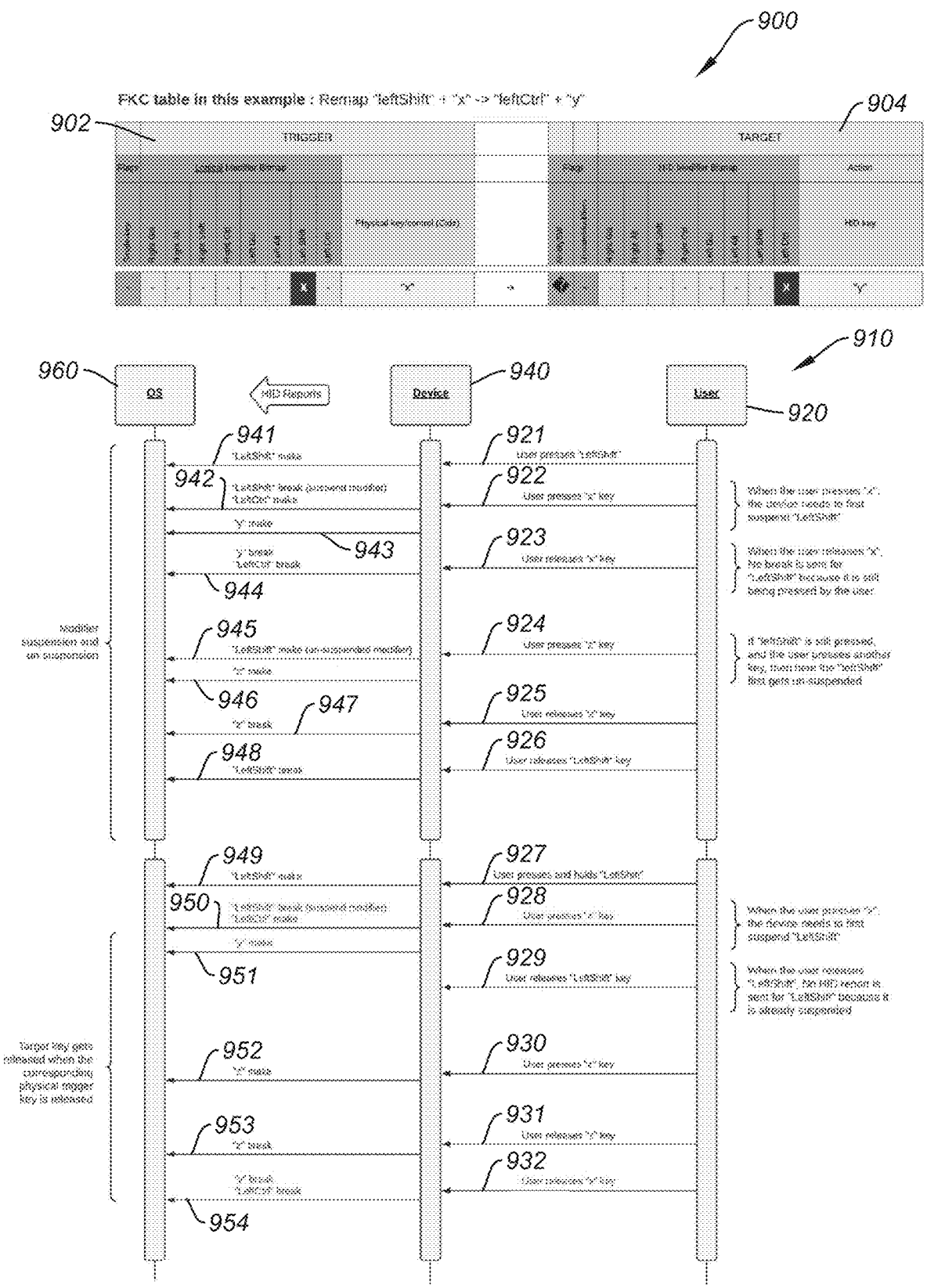
FIG. 9 is a simplified flow chart showing aspects of a method for remapping keys on an FKC-enabled input device, according to certain embodiments.
Figure 10:
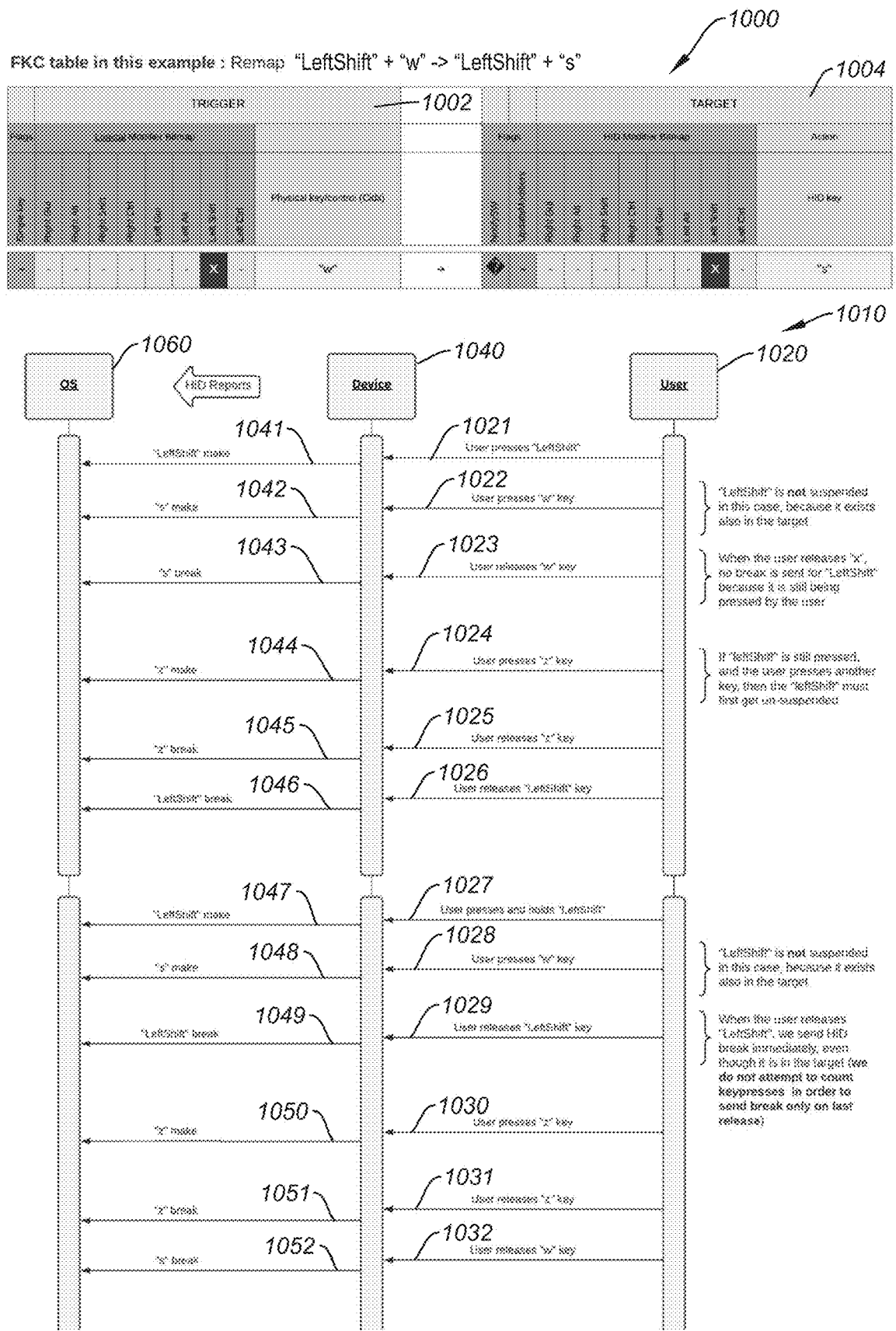
FIG. 10 is a simplified flow chart showing aspects of a method for remapping keys on an FKC-enabled input device, according to certain embodiments.
Figure 11:
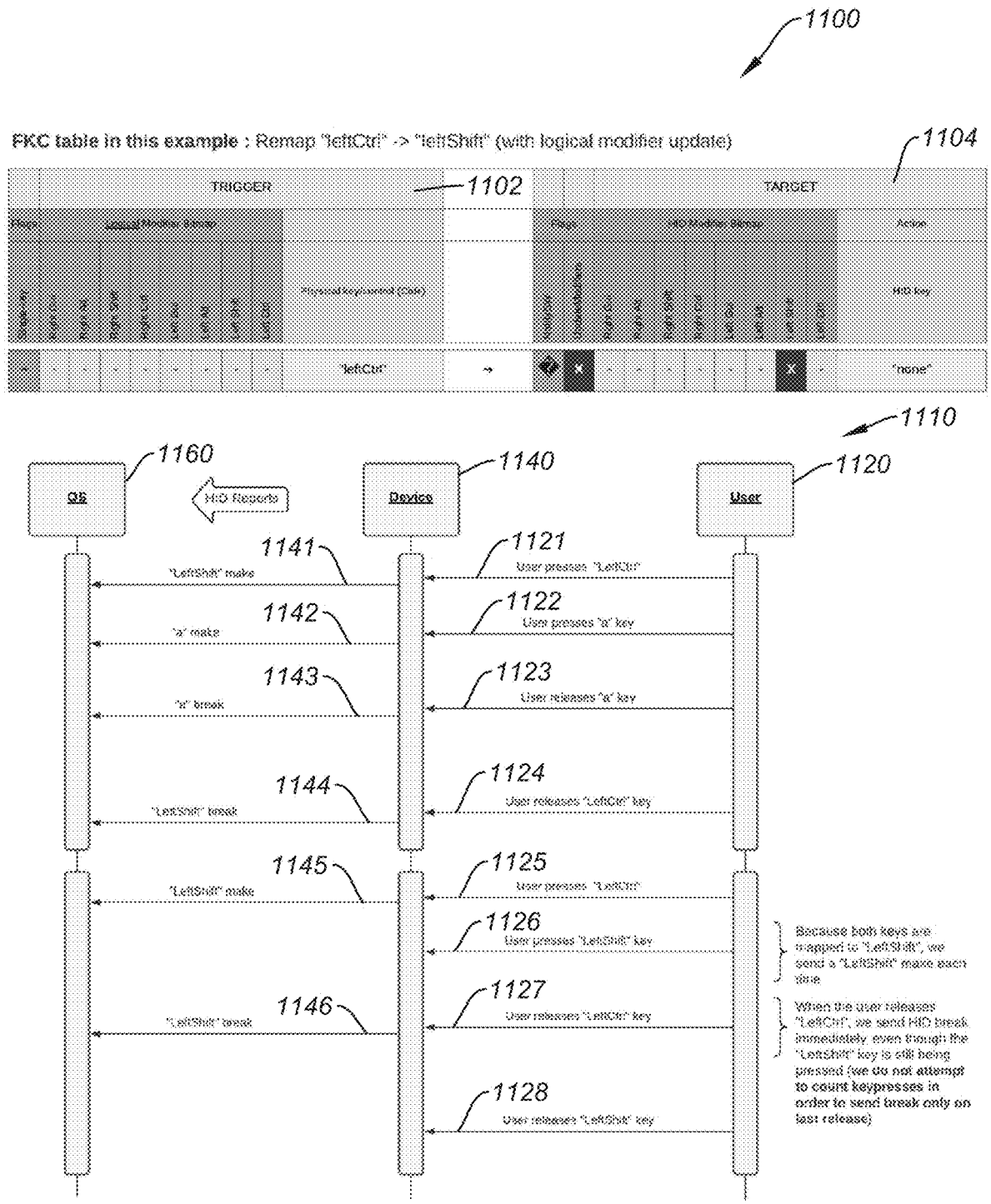
FIG. 11 is a simplified flow chart showing aspects of a method for remapping keys on an FKC-enabled input device, according to certain embodiments.

The following flowcharts of FIGS. 9-11 show examples of how an FKC-enabled input device produces both default and FKC outputs using a low latency, consistent, and reliable manner using the novel FKC innovations described above.

FIG. 9 is a simplified flow chart showing aspects of a method 910 for remapping keys on an FKC-enabled input device (e.g., keyboard 140, 400), according to certain embodiments. Method 910 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 910 can be performed by system 200 (e.g., processors 210 and memory 220 for device 940 (e.g., keyboard 140, 400)), system 300 (e.g., processor(s) 302 and memory storage subsystem 306) host computing device 110), or a combination thereof.

Method 910 shows a flowchart for remapping a key trigger to a key target in an FKC-enabled input device. In particular, the flowchart shows a sequence of events in order to remap "LeftShift"+"x" (key trigger)→"LeftCtrl"+"y" (key target). FKC Table 900 of the key remapping database includes a key trigger 902 and key target 904 look up table identifying the various logical/HID modifier bitmap, physical keys, corresponding flags and actions, and the like, for the FKC-enabled input device to identify the intended trigger/target pair.

Referring back to method 910, user 920 can be a person, AI, or the like, interfacing with the input device 940 (e.g., keyboard 140, 400). The operating system 960 can be MS Windows®, Linux®, MacOS®, Android®, iOS®, ChormeOS®, or any suitable operating system configured to operate as a platform to directly or indirectly (e.g., through software running the OS) perform the FKC steps described herein. Device 940 can be any suitable FKC-enabled input device (e.g., keyboard 140, 400) and may communicate with OS 960 via HID reports or other suitable communication protocol, as would be appreciated by one of ordinary skill in the art with the benefit of this disclosure.

At operation 921, user 920 presses "LeftShift" on device 940. Device 940 can immediately send a "LeftShift" make command via HID report to OS 960 (operation 941). User 920 then presses the "x" key (operation 922), and device 940 sends a HID report with instructions causing the OS 960 to perform a "LeftShift" break (e.g., suspend modifier) and "LeftCtrl" make command (operation 942), followed by a "y" make command (operation 943). The user then releases the "x" key (operation 923) and device 940 sends instructions causing OS 960 to perform a "y" break and "LeftCtrl" break command (operation 944). Note that when the user presses "x," the device needs to first suspend "LeftShift" because it was already sent to the OS (for latency, reliability, and consistency as described above). When the user releases "x," no break is sent for "LeftShift" because it is still being pressed by the user.

At the end of the sequence above, if "LeftShift" is still pressed and the user presses another key, then "LeftShift" first gets un-suspended because "LeftShift" needs to be applied in a default manner as the combination of "LeftShift" and the new key is not found in FKC table 900, thus "LeftShift" will now apply, as detailed in the following sequence:

At operation 924, a user presses a "z" key, while the "LeftShift" key is still pressed from the previous sequence (operation 921-944). Device 940 then sends a "LeftShift" make command (un-suspend modifier—operation 945) and a "z" make command (operation 946) thereby instantiating a "LeftShift+z" command at OS 960, which is a non-FKC key trigger. When the user releases the "z" key (operation 924), device 940 sends a "z" break command (operation 947). When the user releases the "LeftShift" key (operation 926), device 940 sends a "LeftShift" break command 948. Note that the modifier in the OS is suspended and un-suspended at various times in response to corresponding instructions from the input device to apply an FKC-based customization and revert back to a non-FKC based output, as required by the key sequence.

In the next key sequence, when a user presses "LeftShift"+"x" (an FKC trigger), the "LeftShift" modifier is suspended, similar to the sequence described above. However, when the user releases "LeftShift," no HID report is sent by device 940 because "LeftShift" is already suspended. Also note that in the following sequence, the target key gets released when the corresponding physical trigger key is released.

At operation 927, the user presses and holds "LeftShift" and device 940 then sends a "LeftShift" make command to OS 960. The user then presses the "x" key (operation 928) and device 940 sends a "LeftShift" break (suspend modifier), a "LeftCtrl" make (operation 950), and a "y" make command (operation 951). When the user releases "LeftShift" key (operation 929), no HID report is sent because "LeftShift" is already suspended. At operation 930, the user presses a "z" key and device 940 sends a "z" make command to OS 960 (operation 952). At operation 931, the user releases the "z" key and device 940 sends a "z" break command (operation 953). At operation 932, the user releases the "x" key and device 940 sends a "y" break and "LeftCtrl" break command to OS 960 (operation 954). Note that the target key gets released when the corresponding physical trigger key is released.

It should be appreciated that the specific steps illustrated in FIG. 9 provide a particular method 900 for remapping keys on an FKC-enabled input device, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

FIG. 10 is a simplified flow chart showing aspects of a method 1010 for remapping keys on an FKC-enabled input device (e.g., keyboard 140, 400), according to certain embodiments. Method 1010 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1010 can be performed by system 200 (e.g., processors 210 and memory 220 for device 1040 (e.g., keyboard 140, 400)), system 300 (e.g., processor(s) 302 and memory storage subsystem 306) host computing device 110), or a combination thereof.

Method 1010 shows a flowchart for remapping a key trigger to a key target in an FKC-enabled input device. In particular, the flowchart shows a sequence of events in order to remap "LeftShift"+"w" (key trigger)→"LeftShift"+"s" (key target). FKC Table 1000 of the key remapping database includes a key trigger 1002 and key target 1004 look up table identifying the various logical/HID modifier bitmap, physical keys, corresponding flags and actions, and the like, for the FKC-enabled input device to identify the intended trigger/target pair. Referring to method 1010, user 1020, device 1040, and OS 1060 can be similar to the user 920, device 940, and OS 960, respectively, of FIG. 9.

At operation 1021, user 1020 presses "LeftShift" on device 1040. Device 1040 can immediately send a "LeftShift" make command via HID report to OS 1060 (operation 1041). User 1020 then presses the "w" key (operation 1022), and device 1040 sends a HID report with instructions causing the OS 1060 to perform a "s" make (operation 1042). Note that the "LeftShift" is not suspended in this case (unlike method 900) because LeftShift also exists in the target key. At operation 1023, the user releases the "w" key and device 1040 sends an "s" break command to OS 1060. Note that when the user releases "x," no break is sent to "LeftShift" because it is still being pressed by the user. At operation 1024, the user presses a "z" key and device 1040 sends a "z" make command to OS 1060 (operation 1044). In this case, if "LeftShift" is still pressed, and the user presses another key, then the "LeftShift" command should first be un-suspended. At operation 1025, the user releases the "z" key and device 1040 sends a "z" break command to OS 1060. At operation 1026, the user releases the "LeftShift" key and device 1040 sends a "LeftShift" break command to OS 1060.

At operation 1027, a user presses and holds "LeftShift" and device 1040 then sends a "LeftShift" make command (operation 1047). The user then presses the "w" key (operation 1028) and device 1040 sends an "s" make command to OS 1060. Note that "LeftShift" is not suspended in this case because it also exists in the target. At operation 1029, the user releases the "LeftShift" key and device 1040 sends a "LeftShift" break command to OS 1060. When the user releases "LeftShift," device 1040 sends the HID break immediately, even though it is not in the target because, in some embodiments, FKC does not attempt to count keypresses in order to send a break command only on the last release. At operation 1030, the user presses the "z" key and device 1040 sends a "z" make command to OS 1060 (operation 1050). At operation 1031, the user releases the "z" key and device 1040 sends a "z" break command to OS 1060 (operation 1051). At operation 1032, the user releases the "w" key and device 1040 sends an "s" break command to OS 1060 (operation 1052).

It should be appreciated that the specific steps illustrated in FIG. 10 provide a particular method 1000 for remapping keys on an FKC-enabled input device, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

FIG. 11 is a simplified flow chart showing aspects of a method 1110 for remapping keys on an FKC-enabled input device (e.g., keyboard 140, 400), according to certain embodiments. Method 1110 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1110 can be performed by system 200 (e.g., processors 210 and memory 220 for device 1140 (e.g., keyboard 140, 400)), system 300 (e.g., processor(s) 302 and memory storage subsystem 306) host computing device 110), or a combination thereof.

Method 1110 shows a flowchart for remapping a key trigger to a key target in an FKC-enabled input device. In particular, the flowchart shows a sequence of events in order to remap "LeftCtrl" (key trigger)→"LeftShift" with a logical modifier update. FKC Table 1100 of the key remapping database includes a key trigger 1102 and key target 1104 look up table identifying the various logical/HID modifier bitmap, physical keys, corresponding flags and actions, and the like, for the FKC-enabled input device to identify the intended trigger/target pair. Referring to method 1110, user 1120, device 1140, and OS 1160 can be similar to the user 920, device 940, and OS 960, respectively, of FIG. 9.

At operation 1121, user 1120 presses "LeftCtrl" on device 1140. Device 1140 can immediately send a "LeftCtrl" make command via HID report to OS 1160 (operation 1141). User 1120 then presses the "a" key (operation 1122), and device 1140 sends a HID report with instructions causing the OS 1160 to perform an "a" make (operation 1142). At operation 1123, the user releases the "a" key and device 1140 sends an "a" break command to OS 1160. At operation 1124, the user releases the "LeftCtrl" key and device 1140 sends a "LeftShift" break command to OS 1160 (operation 1144). Note that, in some embodiments, there is no differentiation of upper and lower case characters in HID scan codes, and capitalization is typically determined by the OS based on whether a shift key is depressed. This concept may apply to any of the examples presented herein. Applied here, a "LeftShift" make and an "a" make are sent, and the OS determines whether a capital "A" will be applied, as would be appreciated by one of ordinary skill in the art with the benefit of this disclosure.

At operation 1125, user 1120 presses "LeftCtrl" and device 1140 sends a "LeftShift" make to OS 1160. At operation 1126, user 1120 presses "LeftShift" key. At operation 1127, the user releases "LeftCtrl" and device 1140 sends "LeftShift" break to OS 1160 (operation 1146). At operation 1128, the user releases the "LeftShift" key. In this case, when the user releases "LeftCtrl," device 1140 sends a HID break immediately even through the "LeftShift" key is still being pressed because, in certain embodiments, keypresses are not counted and breaks are only sent on the last release.

It should be appreciated that the specific steps illustrated in FIG. 10 provide a particular method 1000 for remapping keys on an FKC-enabled input device, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

Figure 12:
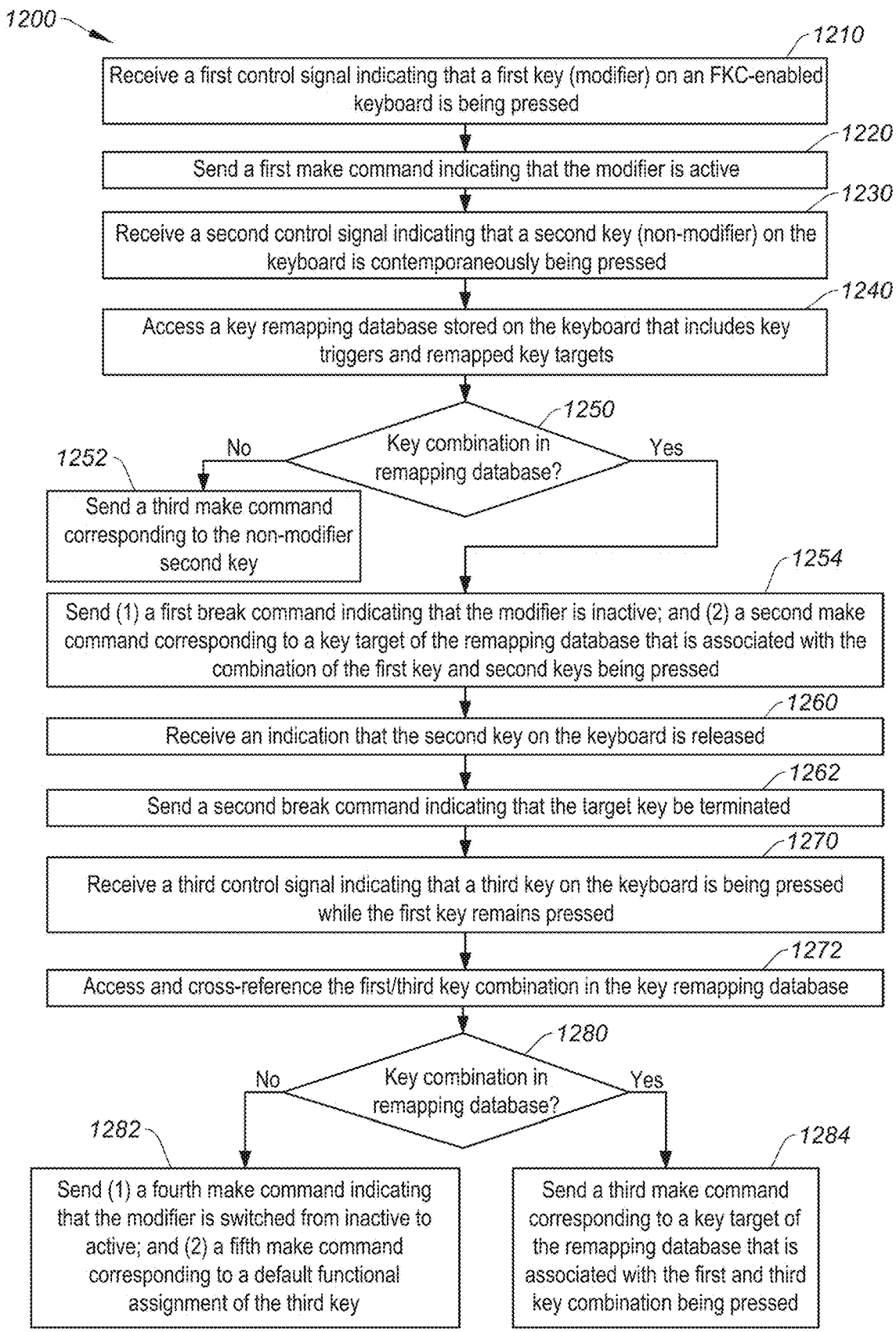
FIG. 12 is a simplified flow chart showing aspects of a method for remapping keys on an FKC-enabled input device, according to certain embodiments.

FIG. 12 is a simplified flow chart showing aspects of a method 1200 for remapping keys on an FKC-enabled input device (e.g., keyboard 140, 400), according to certain embodiments. Method 1200 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1200 can be performed by system 200 (e.g., processors 210 and memory 220), system 300, or a combination thereof.

At operation 1210, method 1200 can include receiving (e.g., by processor(s) 210) a first control signal indicating that a first key on the keyboard is being pressed, the first key functionally assigned as a logical modifier, according to certain embodiments.

At operation 1220, method 1200 can include sending, by the one or more processors to a host computing device communicatively coupled to the keyboard, a first make command indicating that the (logical) modifier is active, according to certain embodiments. In some embodiments, the keyboard communicates with the host computing device via human interface device (HID)-type commands.

At operation 1230, method 1200 can include receiving, by the one or more processors, a second control signal indicating that a second key on the keyboard is contemporaneously being pressed, the second key functionally assigned as a non-modifier, alphanumeric character, according to certain embodiments.

At operation 1240, method 1200 can include accessing, by the one or more processors, a key remapping database stored on the keyboard that includes key triggers and remapped key targets, each key trigger corresponding to a specific combination of one or more keys of the keyboard, and each corresponding key target corresponding to a different functional assignment than a default functional assignment for the combination of the one or more keys, according to certain embodiments. In some aspects, the key remapping database is stored as a list-based or bitfield based database on memory stored on the keyboard.

At operation 1250 of method 1200, in response to determining that the combination of the first key and the second key are not included as a key trigger in the key remapping database, sending, by the one or more processors to the host computing device while the first and second keys are pressed, a third make command corresponding to the non-modifier, alphanumeric character of the second key (operation 1252), according to certain embodiments.

At operation 1250 of method 1200, in response to determining that the combination of the first key and the second key are included as a key trigger in the key remapping database: sending, by the one or more processors to the host computing device while the first and second keys are pressed, a first break command indicating that the (logical) modifier is inactive; and sending, by the one or more processors to the host computing device while the first and second keys are pressed (operation 1254), a second make command corresponding to a key target of the remapping database that is associated with the combination of the first key and second keys being pressed, according to certain embodiments.

At operation 1260, method 1200 can include receiving, by the one or more processors, an indication that the second key on the keyboard is released, according to certain embodiments.

At operation 1262, method 1200 can include sending, by the one or more processors to the host computing device, a second break command indicating that the target key be terminated, according to certain embodiments.

At operation 1270, method 1200 can include receiving, by the one or more processors, a third control signal indicating that a third key on the keyboard is being pressed while the first key remains pressed, according to certain embodiments.

At operation 1272, method 1200 can include accessing, by the one or more processors, the key remapping database, according to certain embodiments.

At operation 1280, in response to determining that the combination of the first key and the third key are not included as a key trigger in the remapping database, method 1200 can include: sending, by the one or more processors to the host computing device while the first and third keys are pressed, a fourth make command indicating that the (logical) modifier is switched from inactive to active; and sending, by the one or more processors to the host computing device while the first and third keys are pressed, a fifth make command corresponding to a default functional assignment of the third key (operation 1282), according to certain embodiments.

At operation 1280, in response to determining that the combination of the first key and the third key are included as a key trigger in the remapping database, method 1200 can include sending, by the one or more processors to the host computing device while the first and third keys are pressed, a third make command corresponding to a key target of the remapping database that is associated with the combination of the first key and third keys being pressed (operation 1284), according to certain embodiments.

It should be appreciated that the specific steps illustrated in FIG. 12 provide a particular method 1200 for remapping keys on an FKC-enabled input device, according to certain embodiments, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase®. and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method comprising:

receiving, by one or more processors of a keyboard, a first control signal indicating that a first key on the keyboard is being pressed, the first key functionally assigned as a modifier;

sending, by the one or more processors to a host computing device communicatively coupled to the keyboard, a first make command indicating that the modifier is active;

receiving, by the one or more processors, a second control signal indicating that a second key on the keyboard is contemporaneously being pressed, the second key functionally assigned as a non-modifier, alphanumeric character;

accessing, by the one or more processors, a key remapping database stored on the keyboard that includes key triggers and remapped key targets, each key trigger corresponding to a specific combination of one or more keys of the keyboard, and each corresponding key target corresponding to a different functional assignment than a default functional assignment for the combination of the one or more keys;

in response to determining that the combination of the first key and the second key are included as a key trigger in the key remapping database:

sending, by the one or more processors to the host computing device while the first and second keys are pressed, a first break command indicating that the modifier is inactive; and sending, by the one or more processors to the host computing device while the first and second keys are pressed, a second make command corresponding to a key target of the remapping database that is associated with the combination of the first key and second keys being pressed; and in response to determining that the combination of the first key and the second key are not included as a key trigger in the key remapping database:

sending, by the one or more processors to the host computing device while the first and second keys are pressed, a third make command corresponding to the non-modifier, alphanumeric character of the second key.

2. The method of claim 1 further comprising:
receiving, by the one or more processors, an indication that the second key on the keyboard is released; and
sending, by the one or more processors to the host computing device, a second break command indicating that the target key be terminated.

3. The method of claim 2 further comprising:
receiving, by the one or more processors, a third control signal indicating that a third key on the keyboard is being pressed while the first key remains pressed;
accessing, by the one or more processors, the key remapping database; and
in response to determining that the combination of the first key and the third key are included as a key trigger in the remapping database:
sending, by the one or more processors to the host computing device while the first and third keys are pressed, a third make command corresponding to a key target of the remapping database that is associated with the combination of the first key and third keys being pressed.

4. The method of claim 3 further comprising:
in response to determining that the combination of the first key and the third key are not included as a key trigger in the remapping database:
sending, by the one or more processors to the host computing device while the first and third keys are pressed, a fourth make command indicating that the modifier is switched from inactive to active; and
sending, by the one or more processors to the host computing device while the first and third keys are pressed, a fifth make command corresponding to a default functional assignment of the third key.

5. The method of claim 4 further comprising:
receiving, by the one or more processors, an indication that the third key on the keyboard is released;
sending, by the one or more processors to the host computing device, a third break command indicating that the default functional assignment of the third key be terminated;
receiving, by the one or more processors, an indication that the first key on the keyboard is released; and
sending, by the one or more processors to the host computing device, a fourth break command indicating that the modifier is released.

6. The method of claim 1 wherein the key target includes a combination of a plurality of functional assignments.

7. The method of claim 1 wherein the key remapping database is stored as a list-based or bitfield based database on memory stored on the keyboard.

8. The method of claim 1 wherein keyboard communicates with the host computing device via human interface device (HID)-type commands.

9. A keyboard comprising:
one or more processors;
one or more non-transitory, computer-readable storage mediums containing instructions configured to cause the one or more processors to perform operations including:
receiving, by the one or more processors of the keyboard, a first control signal indicating that a first key on the keyboard is being pressed, the first key functionally assigned as a modifier;
sending, by the one or more processors to a host computing device communicatively coupled to the keyboard, a first make command indicating that the modifier is active;
receiving, by the one or more processors, a second control signal indicating that a second key on the keyboard is contemporaneously being pressed, the second key functionally assigned as a non-modifier, alphanumeric character;
accessing, by the one or more processors, a key remapping database stored on the keyboard that includes key triggers and remapped key targets, each key trigger corresponding to a specific combination of one or more keys of the keyboard, and each corresponding key target corresponding to a different functional assignment than a default functional assignment for the combination of the one or more keys;
in response to determining that the combination of the first key and the second key are included as a key trigger in the key remapping database:
sending, by the one or more processors to the host computing device while the first and second keys are pressed, a first break command indicating that the modifier is inactive; and
sending, by the one or more processors to the host computing device while the first and second keys are pressed, a second make command corresponding to a key target of the remapping database that is associated with the combination of the first key and second keys being pressed; and
in response to determining that the combination of the first key and the second key are not included as a key trigger in the key remapping database:
sending, by the one or more processors to the host computing device while the first and second keys are pressed, a third make command corresponding to the non-modifier, alphanumeric character of the second key.

10. The keyboard of claim 9 wherein the instructions are further configured to cause the one or more processors to perform operations including:
receiving, by the one or more processors, an indication that the second key on the keyboard is released; and
sending, by the one or more processors to the host computing device, a second break command indicating that the target key be terminated.

11. The keyboard of claim 10 wherein the instructions are further configured to cause the one or more processors to perform operations including:

receiving, by the one or more processors, a third control signal indicating that a third key on the keyboard is being pressed while the first key remains pressed;

accessing, by the one or more processors, the key remapping database; and in response to determining that the combination of the first key and the third key are included as a key trigger in the remapping database:

sending, by the one or more processors to the host computing device while the first and third keys are pressed, a third make command corresponding to a key target of the remapping database that is associated with the combination of the first key and third keys being pressed.

12. The keyboard of claim 11 wherein the instructions are further configured to cause the one or more processors to perform operations including:

in response to determining that the combination of the first key and the third key are not included as a key trigger in the remapping database:

sending, by the one or more processors to the host computing device while the first and third keys are pressed, a fourth make command indicating that the modifier is switched from inactive to active; and sending, by the one or more processors to the host computing device while the first and third keys are pressed, a fifth make command corresponding to a default functional assignment of the third key.

13. The keyboard of claim 12 wherein the instructions are further configured to cause the one or more processors to perform operations including:

receiving, by the one or more processors, an indication that the third key on the keyboard is released;

sending, by the one or more processors to the host computing device, a third break command indicating that the default functional assignment of the third key be terminated;

receiving, by the one or more processors, an indication that the first key on the keyboard is released; and sending, by the one or more processors to the host computing device, a fourth break command indicating that the modifier is released.

14. A non-transitory computer-program product tangibly embodied in a machine-readable non-transitory storage medium that includes instructions configured to cause one or more processors to perform operations including:

receiving, by the one or more processors of a keyboard, a first control signal indicating that a first key on the keyboard is being pressed, the first key functionally assigned as a modifier;

sending, by the one or more processors to a host computing device communicatively coupled to the keyboard, a first make command indicating that the modifier is active;

receiving, by the one or more processors, a second control signal indicating that a second key on the keyboard is contemporaneously being pressed, the second key functionally assigned as a non-modifier, alphanumeric character;

accessing, by the one or more processors, a key remapping database stored on the keyboard that includes key triggers and remapped key targets, each key trigger corresponding to a specific combination of one or more keys of the keyboard, and each corresponding key target corresponding to a different functional assignment than a default functional assignment for the combination of the one or more keys;

in response to determining that the combination of the first key and the second key are included as a key trigger in the key remapping database:

sending, by the one or more processors to the host computing device while the first and second keys are pressed, a first break command indicating that the modifier is inactive; and sending, by the one or more processors to the host computing device while the first and second keys are pressed, a second make command corresponding to a key target of the remapping database that is associated with the combination of the first key and second keys being pressed; and in response to determining that the combination of the first key and the second key are not included as a key trigger in the key remapping database:

sending, by the one or more processors to the host computing device while the first and second keys are pressed, a third make command corresponding to the non-modifier, alphanumeric character of the second key.

15. The non-transitory computer-program product of claim 14 wherein the instructions further cause one or more processors to perform operations including:

receiving, by the one or more processors, an indication that the second key on the keyboard is released; and sending, by the one or more processors to the host computing device, a second break command indicating that the target key be terminated.

16. The non-transitory computer-program product of claim 15 wherein the instructions are further configured to cause the one or more processors to perform operations including:

receiving, by the one or more processors, a third control signal indicating that a third key on the keyboard is being pressed while the first key remains pressed;

accessing, by the one or more processors, the key remapping database; and in response to determining that the combination of the first key and the third key are included as a key trigger in the remapping database:

sending, by the one or more processors to the host computing device while the first and third keys are pressed, a third make command corresponding to a key target of the remapping database that is associated with the combination of the first key and third keys being pressed.

17. The non-transitory computer-program product of claim 16 wherein the instructions are further configured to cause the one or more processors to perform operations including:

in response to determining that the combination of the first key and the third key are not included as a key trigger in the remapping database:

sending, by the one or more processors to the host computing device while the first and third keys are pressed, a fourth make command indicating that the modifier is switched from inactive to active; and sending, by the one or more processors to the host computing device while the first and third keys are pressed, a fifth make command corresponding to a default functional assignment of the third key.

* * * * *